United States Patent
Iijima et al.

[11] Patent Number: 6,118,475
[45] Date of Patent: Sep. 12, 2000

[54] MULTI-EYE IMAGE PICKUP APPARATUS, AND METHOD AND APPARATUS FOR MEASURING OR RECOGNIZING THREE-DIMENSIONAL SHAPE

[75] Inventors: Katsumi Iijima, Hachioji; Masakazu Matsugu, Chiba-ken; Kotaro Yano, Yokohama; Toshiaki Kondo, Fujisawa; Katsuhiko Mori, Kawasaki, all of Japan

[73] Assignee: Canon Kabushiki Kaisha, Tokyo, Japan

[21] Appl. No.: 08/457,397

[22] Filed: Jun. 1, 1995

[30] Foreign Application Priority Data

Jun. 2, 1994 [JP] Japan .................................. 6-121133
Jul. 1, 1994 [JP] Japan .................................. 6-150739
Jul. 29, 1994 [JP] Japan .................................. 6-178569

[51] Int. Cl.$^7$ .................................................. H04N 13/00
[52] U.S. Cl. ............................... 348/42; 348/47; 348/48
[58] Field of Search ............................ 348/42–43, 47–48, 348/208, 214, 219, 262, 416, 699; 382/154, 285; 359/466

[56] References Cited

U.S. PATENT DOCUMENTS

| 5,475,422 | 12/1995 | Mori et al. ................................. 348/48 |
| 5,552,823 | 9/1996 | Kageyama ............................... 348/155 |
| 5,731,849 | 3/1998 | Kondo et al. ............................ 348/699 |
| 5,798,791 | 8/1998 | Katayama et al. ...................... 348/218 |
| 5,801,760 | 9/1998 | Uomori ..................................... 348/47 |
| 5,864,360 | 1/1999 | Okauchi et al. .......................... 348/47 |
| 5,903,303 | 5/1999 | Fukushima et al. ...................... 348/47 |

*Primary Examiner*—Vu Le
*Attorney, Agent, or Firm*—Morgan & Finnegan, LLP

[57] ABSTRACT

An apparatus is arranged to have two cameras set at a predetermined angle of convergence, image motion vector extracting portions each for extracting motion vectors between predetermined frames from images obtained in time series from the respective cameras, a stereoscopic parallax extracting portion for extracting a stereoscopic parallax between the predetermined frames, and a portion for obtaining final motion vectors or distance information from the motion vectors extracted by the respective motion vector extracting portions and the stereoscopic parallax extracted by the stereoscopic parallax extracting portion.

26 Claims, 26 Drawing Sheets

TIME = t

TIME = t + Δt

FIG. 6
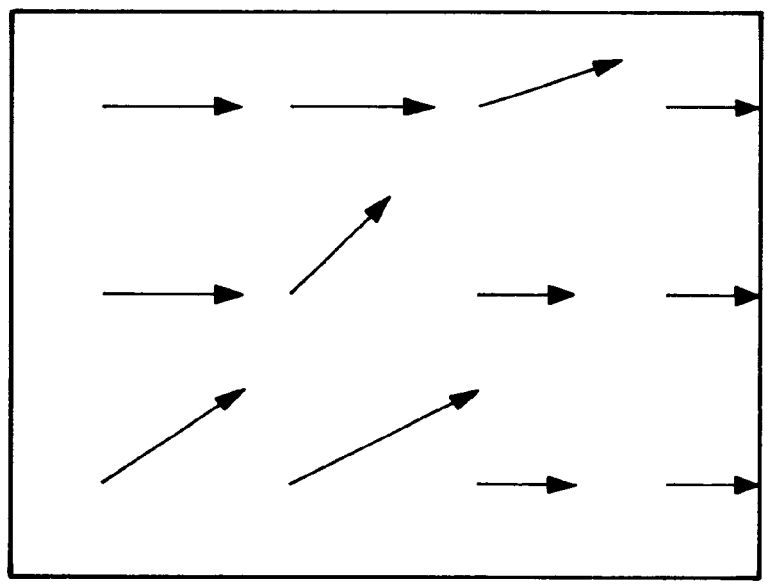
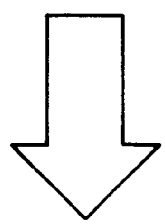
CONVERSION PROCESSING
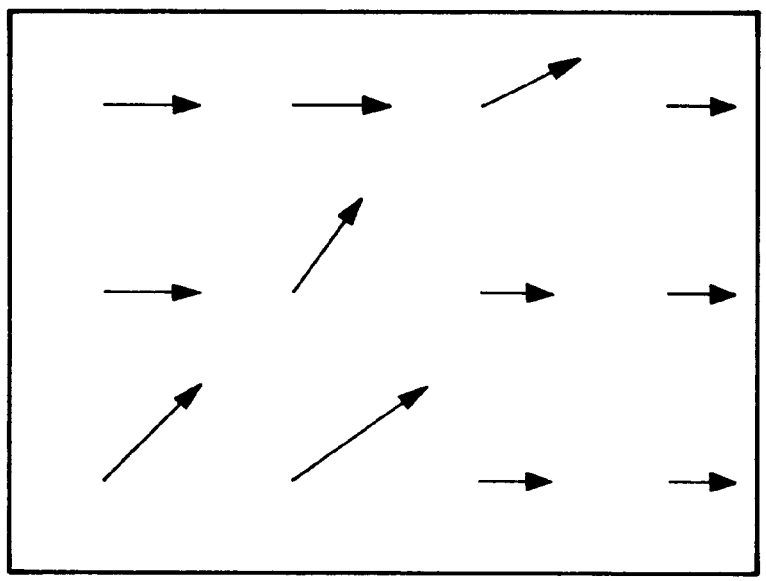

FIG. 7A

LABELLING AS TO IMAGE
MOTION VECTORS 40, 90

| T' | T' | F' | T' |
|----|----|----|----|
| T' | F' | T' | T' |
| T' | F' | T' | T' |

FIG. 7B

LABELLING AS TO IMAGE
MOTION VECTORS 50, 100

| T' | T' | T' | T' |
|----|----|----|----|
| F' | T' | T' | F' |
| T' | T' | F' | T' |

FIG. 9
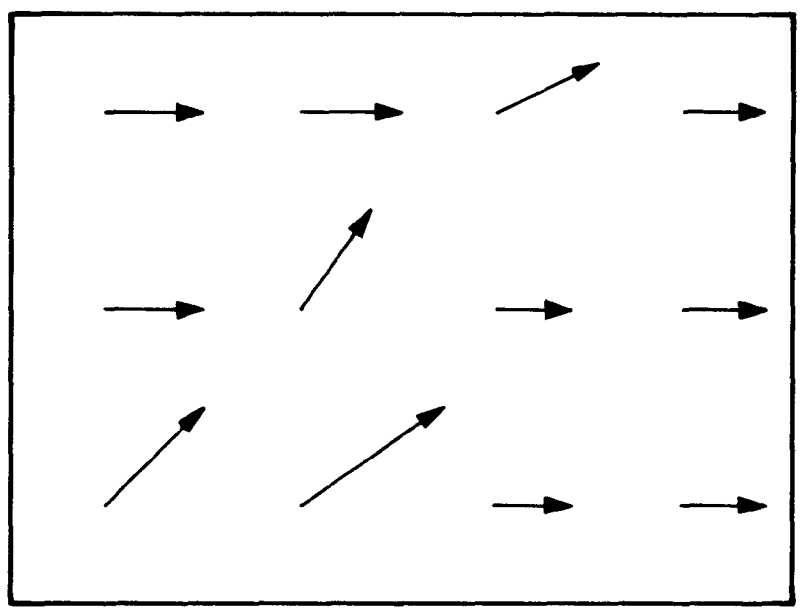
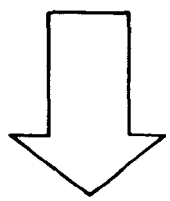
CONVERSION PROCESSING
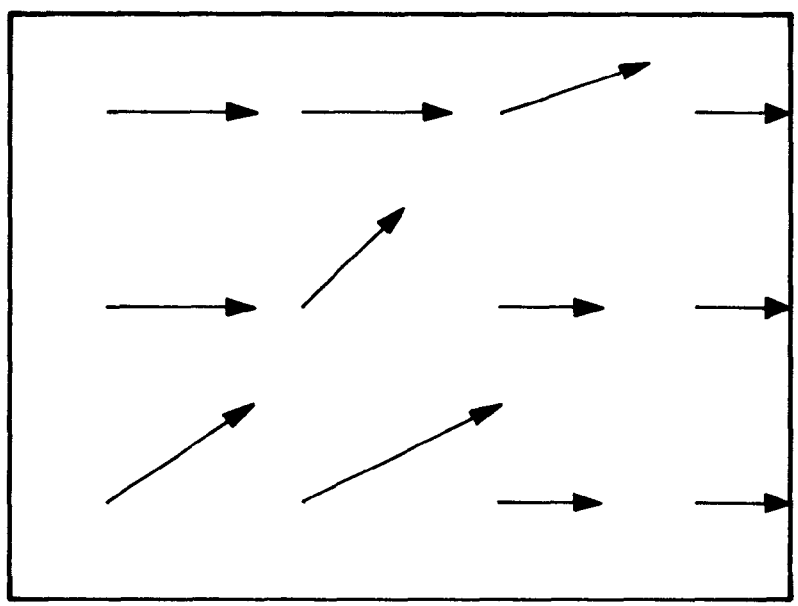

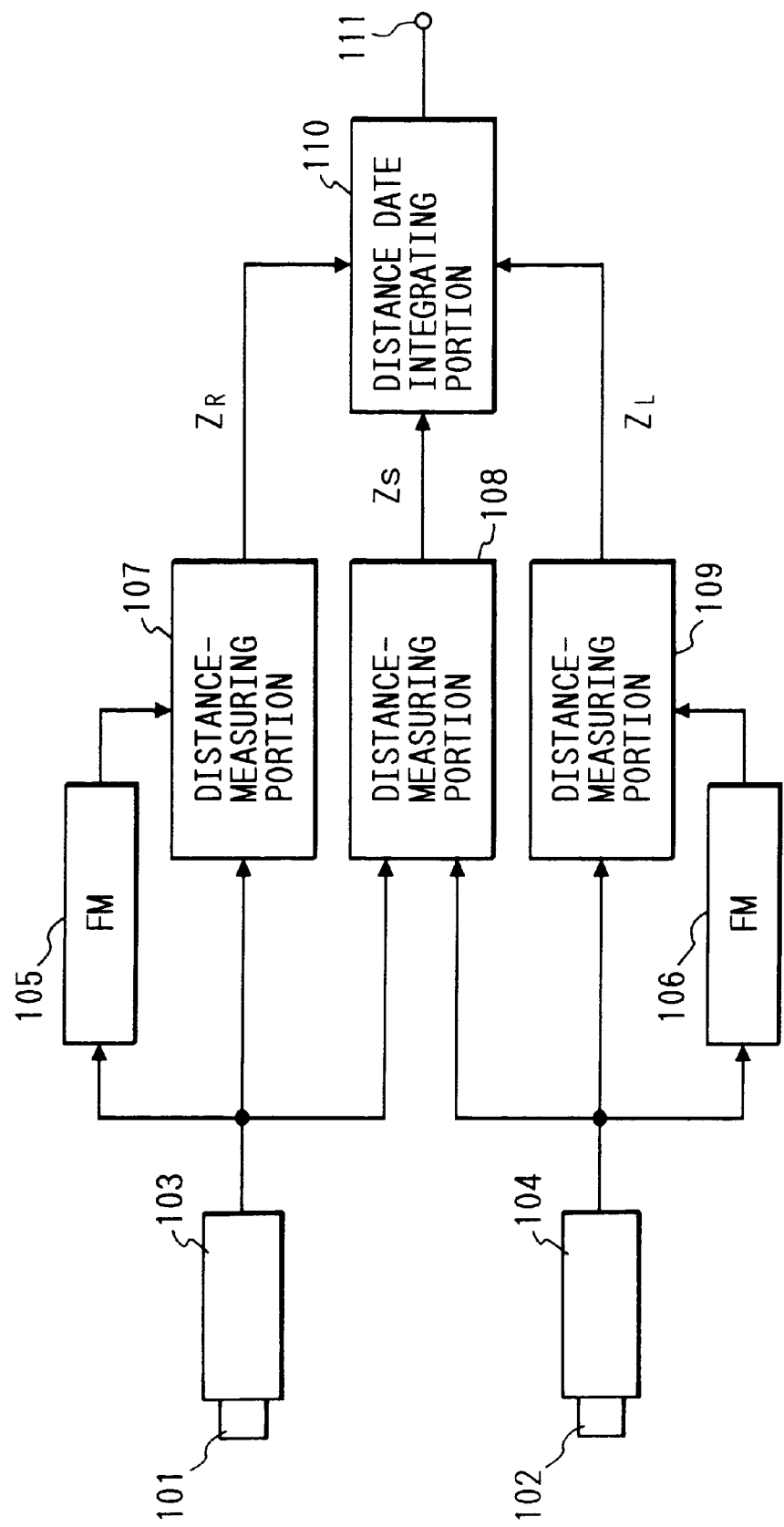

FIG. 23A  GRADIENT IN HORIZONTAL DIRECTION 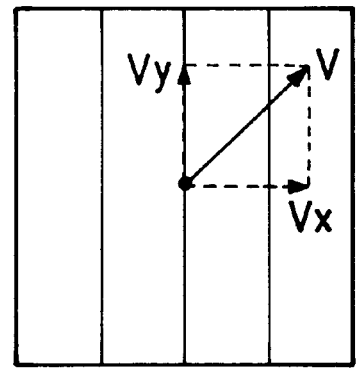
FIG. 23B  GRADIENT IN VERTICAL DIRECTION 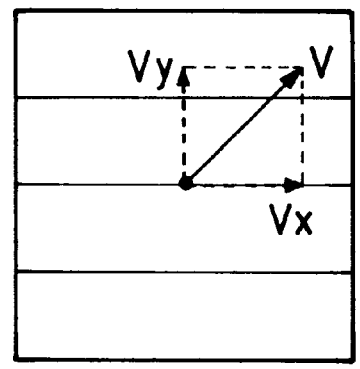
FIG. 23C  GRADIENT IN DIAGONAL DIRECTION 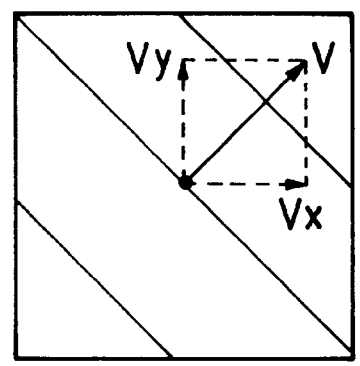

MULTI-EYE IMAGE PICKUP APPARATUS, AND METHOD AND APPARATUS FOR MEASURING OR RECOGNIZING THREE-DIMENSIONAL SHAPE

BACKGROUND OF THE INVENTION

1. Field of the Invention

The present invention relates to multi-eye image pickup apparatus provided with motion vector detecting means necessary for image coding apparatus or image blur correcting apparatus, and three-dimensional object shape measuring or recognizing method and apparatus for measuring or recognizing the environment, obstacles, topography, industrial articles, etc. in non-contact therewith from image data.

2. Related Background Art

Motion vector detecting methods for obtaining a moving amount of an object picked up, from image signals picked up in time series are necessary and indispensable for image coding apparatus, image blur correcting apparatus, etc. Specific examples of the vector detecting methods are the temporal-spatial high gradient method as described in the specification of U.S. Pat. No. 3,890,462 or the bulletin of Japanese Patent Publication No. 60-46878, the correlation method based on correlation calculation, the block matching method (template matching method), etc. Among these techniques, the temporal-spatial high gradient method is discussed in detail by B. K. P. Horn et al. in Artificial Intelligence 17, p185–203 (1981); the block matching method is discussed in detail by Morio ONOE et al. in Information Processing (Joho Shori) Vol. 17, No. 7, p634–640, July 1976. These motion vector detecting methods will be briefly described below.

First described is the temporal-spatial gradient method. Letting $d(x, y, t)$ be a luminance at point $(x, y)$ on an image at time $t$ and $(x+\delta x, y+\delta y)$ be a position of the point after a lapse of infinitesimal time $\delta t$, the luminance $d(x, y, t)$ is expressed as follows.

$$d(x, y, t) = d(x+\delta x, y+\delta y, t+\delta t)$$

Then Taylor expansion of $d(x+\delta x, y+\delta y, t+\delta t)$ yields the following.

$$d(x+\delta x, y+\delta y, t+\delta t) = d(x, y, t) + \delta x(\partial d/\partial x) + \delta y(\partial d/\partial y) + \delta t(\partial d/\partial t) + \ldots$$

Omitting the higher terms in this equation, the following is derived.

$$0 = \delta x(\partial d/\partial x) + \delta y(\partial d/\partial y) + \delta t(\partial d/\partial t)$$

Here, putting $(\partial d/\partial x) = dx$, $(\partial d/\partial y) = dy$, $(\partial d/\partial t) = dt$, the following equations hold.

$$0 = \delta x\, dx + \delta y\, dy + \delta t\, dt$$

$$0 = (\partial x/\partial t) dx + (\partial y/\partial t) dy + dt$$

putting $(\partial x/\partial t) = u$ and $(\partial y/\partial t) = v$, the following equation is finally obtained.

$$u\, dx + v\, dy + dt = 0$$

Here, $(u, v)$ corresponds to a moving amount of a pixel on a screen.

Thus, if $v=0$ is known (for example, if the motion is horizontal) the above equation gives the following.

$$u = -(dt/dx)$$

Thus, $u$ can be obtained.

An example using the temporal-spatial gradient method is described, for example, in the above bulletin of Japanese Patent Publication No. 60-46878, in which a gradient e is obtained of an image signal level corresponding to an arbitrary position of image and a change d in a fixed time period is further obtained of the image signal level corresponding to the arbitrary position, whereby a moving amount of image at the above arbitrary position in the fixed time period is obtained from a value of d/e.

Next described is the block matching method. The block matching method is a method which includes splitting one of two frames picked up in time series, which are used in extraction of displacement vectors, into a plurality of blocks of an appropriate size (for example, 8 pixels×8 lines), calculating deviation amounts between pixels in each block and pixels in a certain range in the other frame (or field) every split block, and searching a position of a block in the other frame (or field) to minimize a sum of absolute values of the deviation amounts calculated. Namely, in this block matching method, a relative deviation of each block in each frame represents a motion vector of the block.

In conventional multi-eye image pickup apparatus, motion vectors of image are detected between frames at a predetermined time for each camera, using either one of the above-described motion vector detecting methods. Namely, correspondent points are obtained between frames in the predetermined time period from image signals input in time series through each camera and motion vectors of image at the correspondent points are extracted for each camera. The above-described motion vector detecting methods each are based on the premise that there exist correspondent points between images for detecting a motion of image.

Incidentally, a widely used method as a conventional 3D shape measuring/recognizing method using image data is one which measures a shape according to the principle of triangulation, so-called stereo distance-measuring method, using spatial positional information obtained from correspondence relations of points in a target object in a plurality of image data picked up from different visual points to the target object. As one of the stereo distance-measuring methods there is a method for realizing a pseudo-stereo distance-measuring method using time-serial image data picked up as changing visual points with a single eye.

Also, there is a method for measuring a three-dimensional shape of an object, using time-serial images picked up as changing angles of view with a single eye (cf. the bulletin of Japanese Laid-open Patent Application No. 5-209730). This method will be called a zoom distance-measuring method.

Next described referring to FIG. 26 and FIG. 27 are principles of distance measurement in the above stereo distance-measuring method and zoom distance-measuring method.

FIG. 26 is a drawing for illustrating the principle of triangulation as a basic principle in the stereo distance-measuring method. In the drawing, symbols D, f, B, $h_L$, and $h_R$ represent an object distance, a focal length, a baseline, an image position of an object in a left pickup system, and an image position of the object in a right pickup system, respectively.

From the drawing it is obvious that the following geometric relation holds. Namely, $$(h_R - h_L) : f = B : (D - f) \tag{1}$$

Solving Equation (1) with respect to the object distance D, $$D = (B \cdot f)/(h_R - h_L) + f \tag{2}$$

In Equation (2), B, f are know constants, and thus, a parallax $(h_R-h_L)$ needs to be detected on an image pickup plane in order to obtain the object distance D. For this, normally performed is image processing such as the matching method or the gradient method, based on correlation calculation (cf. the bulletin of Japanese Patent Publication No. 60-46878).

The distance-measuring principle of the zoom distance-measuring method is next described using FIG. 27. In the drawing, D, $f_w$, $f_t$, $h_w$, $h_t$, and H represent an object distance, a focal length upon wide-angle, a focal length upon telephoto, an image position of an object upon wide-angle, an image position of the object upon telephoto, and a position of the object, respectively. From the geometric relation of the drawing, the following relations hold.

$$h_w:f_w=H:(D-f_w) \qquad (3)$$

$$h_t:f_t=H:(D-f_t) \qquad (4)$$

Eliminating H and solving these simultaneous Equations (3) and (4) with respect to D, the following is obtained.

$$D=\{(h_w-h_t)\cdot f_w\cdot f_t\}/\{(h_w\cdot f_t)-(h_t\cdot f_w)\} \qquad (5)$$

When the focal lengths in zooming are known, unknowns in the above Equation (5) are two of $h_w$, $h_t$. Thus, similarly as in the above stereo distance-measuring method, the positions of the object on the image pickup plane need to be correctly detected by image processing.

Among the above-described stereo distance-measuring methods (also called as multi-viewpoint image pickup methods or multi-viewpoint distance-measuring methods), next described using FIG. 26, FIG. 28 are the distance-measuring principle of the normal stereo distance-measuring method with two image pickup apparatus (hereinafter referred to as cameras) horizontally arranged and the distance-measuring principle of the front-to-back (parallax) stereo distance-measuring method utilizing image data picked up as moving a single camera back and forth along the optical axis. The former corresponds to the basic principle of multi-viewpoint image pickup methods of a horizontal/vertical plane parallax type whereas the latter to the basic principle of multi-viewpoint image pickup methods of a front-to-back parallax type.

Here, the above "multi-viewpoint image pickup method of the horizontal/vertical plane parallax type" is for recognizing an object according to the triangulation rule using images picked up from different visual points located in parallel with the object, for example as effected by the human eyes or stereo image pickup apparatus. For brevity, this method will be referred to simply as a "stereo image pickup method" or "stereo distance-measuring method." On the other hand, the above "multi-viewpoint image pickup method of the front-to-back parallax type" is a method using images picked upon from different visual points back and forth along the optical axis without changing the optical axis of camera. Hereinafter, this technique will be referred to as a "front-to-back stereo image pickup method" or "front-to-back stereo distance-measuring method" for brevity.

FIG. 26 is a drawing for illustrating the basic principle of the stereo distance-measuring method, i.e., the principle of triangulation, as described above. In the drawing, the symbols D, f, B, $h_L$, and $h_R$ represent the object distance, the focal length, the baseline, the image position of object (target object) in the left pickup system, and the image position of object in the right pickup system, respectively. From the drawing, it is obvious that the following geometric relation holds. Namely, $$(h_R-h_L):f=B:(D-f) \qquad (11)$$

Solving Equation (11) with respect to the object distance D, the following is obtained.

$$D=\{(B\cdot f)/(h_R-h_L)\}+f \qquad (12)$$

In Equation (12), B, f are known constants, and thus, for obtaining the object distance D, it is necessary to detect the parallax $(h_R-h_L)$ on the image pickup plane. Thus, normally performed is the image processing such as the matching method or the gradient method, based on correlation calculation (cf. the bulletin of Japanese Patent Publication No. 60-46878).

Next described referring to FIG. 28 is the distance-measuring principle of the above front-to-back (parallax) stereo distance-measuring method. In FIG. 28, there are symbols H, D, D', h, h', f, among which H is a height from a gazed point on the object to the optical axis, and D, D' are distances between the object and image pickup planes, wherein D is a distance with the camera at a near point to the object and D' a distance with the camera at a far point to the object. Further, h, h' are image points on the image pickup planes at D and D', respectively, and f is the focal length. From the geometric relation in FIG. 28, the following relations hold.

$$H:(D-f)=h:f \qquad (13)$$

$$H:(D'-f)=h':f \qquad (14)$$

From Equation (13), the following equation is obtained.

$$H\cdot f=h\cdot(D-f) \qquad (15)$$

From Equation (14), the following equation is obtained.

$$H\cdot f=h'\cdot(D'-f) \qquad (16)$$

Here, from (15)=(16), the following is obtained.

$$h\cdot(D-f)=h'\cdot(D'-f) \qquad (17)$$

Let us here suppose a moving amount of camera (front-to-back difference) (D'−D) is known. Letting B be the front-to-back difference (D'−D) and solving Equation (17) with respect to D, the following steps result.

$$h\cdot(D-f) = h'\cdot(D'-f)$$
$$= h'\cdot\{(B+D)-f\}$$

Then $$D=\{(B\cdot h')/(h-h')\}+f \qquad (18)$$

From Equation (18), the distance D to the object can be thus calculated if a moving amount (h−h') of the gazed point on the image pickup plane is obtained.

The above description showed the difference between the distance-measuring principles of the left-to-right parallax stereo distance-measuring method and the front-to-back parallax stereo distance-measuring method using FIG. 26 and FIG. 28. From Equations (12) and (18) it is seen that either case results in a correspondence problem of each point between left and right images or between front and back images.

SUMMARY OF THE INVENTION

In the conventional multi-eye image pickup apparatus, motion vectors of image are detected between predetermined frames camera by camera. Thus, correct motion vectors cannot be detected if an object is located at a position where only one camera can view or if noise is mixed in image signals taken by one camera. The conventional image pickup apparatus, which perform coding of images or image blur correction based on such a detection method, had a problem of poor reliability.

An object of the present invention is to provide a multi-eye image pickup apparatus improved in reliability of apparatus, which auto-correlationally extracts motion vectors camera by camera from each of images obtained from respective cameras, which cross-relationally extracts motion vectors as to each of the images, and which determines final motion vectors from the respectively extracted motion vectors.

A multi-eye image pickup apparatus of the present invention is characterized by comprising:

a plurality of image pickup means set at a predetermined angle of convergence, each for picking up an image of a desired object;

a plurality of motion vector extracting means provided corresponding to the image pickup means, each for extracting a first motion vector of the object between predetermined frames from images obtained in time series by the corresponding image pickup means;

stereoscopic parallax extracting means for extracting a stereoscopic parallax of the object between the predetermined frames from images obtained in time series from the respective image pickup means;

stereoscopic parallax motion vector extracting means for extracting a stereoscopic parallax motion vector of the object between the predetermined frames from the stereoscopic parallax extracted by the stereoscopic parallax extracting means;

converting means for converting the stereoscopic parallax motion vector extracted by the stereoscopic parallax motion vector extracting means into second motion vectors corresponding to the first motion vectors, based on the predetermined angle of convergence; and motion vector determining means for determining the final motion vector of the object between the predetermined frames from the first motion vectors extracted by the respective motion vector extracting means and the second motion vectors converted into by the converting means.

In this case, the apparatus is characterized in that extraction of the motion vectors, the stereoscopic parallax, and the stereoscopic parallax motion vector by the motion vector extracting means, the stereoscopic parallax extracting means, and the stereoscopic parallax motion vector extracting means is carried out by extracting common regions from images obtained in time series from the image pickup means or from images obtained from the respective image pickup means and obtaining a relative deviation amount between the common regions extracted.

Further, it is characterized in that the motion vector determining means comprises comparing and investigating means provided corresponding to the respective motion vector extracting means, each for investigating if the first motion vectors each extracted by the motion vector extracting means are coincident with the second motion vectors converted by the converting means, and integrating means for integrating the first motion vectors with the second motion vectors, based on results of investigation by the respective comparing and investigating means; and in that the integrating means is so arranged that if a first motion vector coincides with a second motion vector the integrating means takes a mean value or weighted mean of the first and second motion vectors, that if either one of the first motion vectors coincides with a second motion vector the integrating means takes a mean value or weighted mean of the coincident first motion vector and the second motion vector, and that if the second motion vector does not coincide with any of a first motion vectors the integrating means employs either one of the first motion vectors.

The conventional multi-eye image pickup apparatus were able only to obtain motion vectors of images for each image pickup means. In contrast with it, the multi-eye image pickup apparatus of the present invention is arranged to obtain first motion vectors for each image pickup means, further to obtain stereoscopic parallax motion vectors from a stereoscopic parallax of images obtained from the respective image pickup means, to convert the stereoscopic parallax motion vectors thus obtained into second motion vectors corresponding to the above first motion vectors, based on convergence angles of the respective image pickup means, and to obtain final motion vectors from the first and second motion vectors. Thus, even if a portion is located at a position where only one camera can view or even if an image is disturbed because noise is mixed in image signals taken by one camera, correct motion vectors can be detected from the first motion vectors obtained from the other camera and the second motion vectors obtained from the stereoscopic parallax.

In the multi-eye image pickup apparatus of the present invention, extraction of the motion vectors, the stereoscopic parallax, and the stereoscopic parallax motion vector by the motion vector extracting means, the stereoscopic parallax extracting means, and the stereoscopic parallax motion vector extracting means is carried out by extracting common regions from images obtained in time series from the image pickup means or from images obtained from the respective image pickup means and obtaining a relative deviation amount between the common regions extracted.

Since the above-described conventional three-dimensional shape measuring or recognizing method is arranged to perform the search of correspondent points using image data, it has a drawback that sufficient accuracy cannot be achieved if there is no sufficient feature in image or if there are a lot of high-frequency components such as fine periodic patterns.

Since the conventional method uses images obtained from different points of view, there always exists a region which is seen from one point of view but is not seen from the other point of view. Thus, it has a drawback that the distance measurement is theoretically impossible in such a region because of absence of corresponding points.

Since the accuracy of search of correspondent points using image data is directly influenced by characteristics of image data around a gazed point, there is a problem that the measurement results become uncertain and unstable.

In addition to the above problems, the zoom distance-measuring method also has a problem of degradation of accuracy due to a difference of magnifications of patterns between images subjected to correspondence.

The present invention has been accomplished, further taking account of the problems, and an object thereof is to increase certainty and stability of operation of three-dimensional shape measurement of a target object and to enhance reliability of three-dimensional shape measuring or recognizing method and apparatus.

An object of the present invention is to improve the accuracy of the zoom distance-measuring method.

Another object of the present invention is to improve the resolution of measurement of three-dimensional shape for images of a target object.

Another object of the present invention is to realize three-dimensional shape measuring or recognizing method and apparatus of a target object which are flexible in achieving various required accuracies and resolutions so as to have high freedom by sequentially enhancing the distance measurement accuracies of the respective zoom distance measuring method and the stereo distance-measuring method.

In the present invention, performed are a step of performing a stereo distance-measuring method for measuring an object distance, using a plurality of images obtained when an object is taken from a plurality of different points of view;

a step of performing a zoom distance-measuring method for measuring an object distance, using a plurality of time-serial images obtained when the object is taken at a plurality of different angles of view; and a step of measuring a three-dimensional shape of the object by combining a measurement result obtained by the stereo distance-measuring method with a measurement result obtained by the zoom distance-measuring method.

In the present invention, provided are image pickup means for picking up images of an object from a plurality of different points of view and at a plurality of different angles of view;

stereo distance-measuring means for measuring an object distance, using a plurality of images obtained when the image pickup means takes the object from the plurality of points of view;

zoom distance-measuring means for measuring an object distance, using a plurality of images obtained when the image pickup means takes the object at the plurality of angles of view; and integration measuring means for measuring a three-dimensional shape of the object, using a measurement result obtained by the stereo distance-measuring means and a measurement result obtained by the zoom distance-measuring means.

In the present invention, differences of zoom magnifications are corrected between the plurality of images used in the zoom distance-measuring method, using the object distance measured by the stereo distance-measuring method.

In the present invention, there is provided image correcting means for correcting differences of zoom magnifications between the plurality of images used in the zoom distance-measuring means, using the object distance measured by the stereo distance-measuring means.

In the present invention, a plurality of image pickup apparatus are used and the each image pickup apparatus is directed so that the object is included in an angle of view of the apparatus, depending upon a zoom magnification.

In the present invention, the image pickup means comprises a plurality of image pickup apparatus and the each image pickup apparatus is directed so that the object is included in an angle of view of the apparatus, depending upon a zoom magnification.

In the present invention, measurement of the object distance is performed adaptively utilizing a past measurement result in at least one of the stereo distance-measuring method and zoom distance-measuring method.

In the present invention, measurement of the object distance is performed adaptively utilizing a past measurement result in at least one of the stereo distance-measuring means and zoom distance-measuring means.

According to the present invention, the two types of different distance-measuring methods are combined and object distances measured based on the respective methods are used, whereby the certainty and stability of distance measurement operation is increased and the reliability thereof is improved.

According to the present invention, the magnification correction of images is performed depending upon an object distance measured based on the stereo distance-measuring method and a zoom ratio at that time, whereby the accuracy of the zoom distance-measuring method can be improved.

According to the present invention, the plurality of image pickup apparatus are oriented so that the object can be always input, depending upon their angles of view, whereby the trapezoid distortion of images can be readily corrected, which improves the accuracies of the stereo distance-measuring method and the zoom distance-measuring method, which in turn improves the accuracy of integration result of the both methods. Further, because an object can be input across the entire area of screen even with large magnifications, the resolution of distance measurement concerning the object can be enhanced.

According to the present invention, distance information measured in the past and latest distance information is adaptively used based on respective reliabilities, and therefore, stability is increased against noise etc. added at a certain time and the accuracy of distance measurement is improved by information coupling in the temporal direction. Further, because the distance measurement accuracy is sequentially enhanced, the distance measurement is carried out with high freedom and can flexibly meet a variety of required specs.

Incidentally, the above-described front-to-back (parallax) stereo distance-measuring method has a problem of degradation of accuracy due to a difference of magnifications of patterns between images to be subjected to correspondence, in addition with the above-described problems. Moreover, it has further problems that zoom ratios become larger with larger front and back positions of visual points, that a common field region becomes smaller between images input through the left and right cameras or upper and lower cameras, that the distance-measurable range becomes smaller, that the resolution is decreased, etc.

The present invention has been accomplished, further taking account of such problems, and an object thereof is to improve the accuracy of the front-to-back stereo image pickup method.

An object of the present invention is to improve the distance measurement accuracy by the multi-viewpoint image pickup method of the front-to-back parallax type by utilizing the object distance obtained by the multi-viewpoint image pickup method of the horizontal/vertical plane parallax type and performing magnification correction between images with different magnifications used in the multi-viewpoint image pickup method of the front-to-back parallax type.

Another object of the present invention is to improve the distance measurement accuracy by the multi-viewpoint image pickup method of the front-to-back parallax type by utilizing the Fourier-Mellin transformation method immune to a magnification change of pattern for correspondence between images with different magnifications utilized in the multi-viewpoint image pickup method of the front-to-back parallax type.

An object of the present invention is to improve the distance measurement accuracies of the two techniques by providing a filter for separating oblique spatial gradient components of input images from horizontal/vertical spatial gradient components thereof, and supplying the respective components to the multi-viewpoint image pickup portion of the horizontal/vertical plane parallax type having a main function to detect parallel movement of image and to the multi-viewpoint image pickup portion of the front-to-back parallax type having a main function to detect a radial motion of image.

Another object of the present invention is to realize three-dimensional shape recognizing method and apparatus with high freedom which can flexibly meet a variety of required accuracies by sequentially enhancing the distance measurement accuracies of the respective front-to-back stereo image pickup method and the stereo distance-measuring method.

Another object of the present invention is to realize an arrangement in which a plurality of cameras arranged left and right or up and down are directed to a common object so that they can take images of the object even if forward or backward movement amounts thereof become larger as compared with the unit time (image sampling time) so as to narrow an effective image region, thereby enabling the arrangement to be applied, for example, to autonomous vehicles running at high speed.

To achieve the above objects, the present invention is characterized by combining the stereo distance-measuring method with the front-to-back stereo distance-measuring method.

The present invention is characterized by performing the magnification correction of images.

The present invention is characterized by utilizing the Fourier-Mellin transformation method for correspondence in the front-to-back stereo distance-measuring method.

The present invention is characterized by having a filter for separating the horizontal/vertical spatial gradient components of images from the oblique spatial gradient components.

The present invention is characterized by integration of distance measurement results in the temporal direction.

The present invention is characterized by orienting the plurality of cameras so as to capture a same object.

According to the present invention, the two types of different distance-measuring methods are combined and a weighted mean is obtained for the information concerning object distances measured based on the respective methods depending upon respective reliabilities, which increases the accuracy, certainty, and stability of distance measurement operation and which improves the reliability. According to the present invention, the magnification correction of images is performed depending upon the distance measurement information measured based on the front-to-back stereo distance-measuring method and the stereo distance-measuring method, which improves the accuracies of the front-to-back stereo distance-measuring method and the stereo distance-measuring method.

The present invention employs the Fourier-Mellin transformation, which is described in detail in "Position, rotation and scale invariant optical correlation" in "Applied Optics, 1976, Vol. 15" (D. Casasen et al.), whereby correspondence is immune to rotation or magnification change of image pattern, thus improving the accuracy of the front-to-back stereo distance-measuring method. (The procedures of the Fourier-Mellin transformation will be described in the description of the third embodiment.)

According to the present invention, the horizontal/vertical components extracted by the filter are supplied with priority to the distance-measuring means by the stereo distance-measuring method and the oblique components extracted are supplied with priority to the distance-measuring means by the front-to-back stereo distance-measuring method. Since the stereo distance-measuring method changes the point of view in parallel, the search of correspondent points is generally performed in parallel directions. Thus, horizontal or vertical spatial gradient information is necessary. On the other hand, since the front-to-back stereo distance-measuring method changes the point of view back and forth along the optical axis of camera, the search of correspondent points is executed in radial directions. Thus, oblique gradient information is effective. The above filter outputs effective gradient components to the respective distance-measuring means, thereby improving the distance measurement accuracies of the both stereo distance measurement and front-to-back stereo distance measurement.

The present invention takes a weighted mean of the distance information measured in the past and the latest distance information based on respective reliabilities, which increases stability against noise suddenly added at a certain time and which improves the accuracy of distance measurement by information coupling in the temporal direction. Further, because the distance measurement accuracy is sequentially enhanced, the invention can realize distance measurement with high freedom that can flexibly meet a variety of required specs.

According to the present invention, the operation is arranged to correct the trapezoid distortion of image generated when cameras are directed to an object so as to keep the same object always within the field depending upon the speed of forward or backward movement of cameras, thereby improving the resolution and distance measurement accuracy of the stereo distance-measuring method for high moving speeds.

BRIEF DESCRIPTION OF THE DRAWINGS

FIGS. 3A and 3B are drawings to show movement of an object between two times upon extraction of image motion vector, wherein FIG. 3A shows an image at time t and FIG. 3B an image at time (t+Δt);

FIG. 6 is a drawing to show changes of image motion vectors by the conversion processing of the converting portions;

FIGS. 7A and 7B show an example of labeling, T' for matching portions and F' for non-matching portions, wherein FIG. 7A shows labeling in a comparing and investigating portion 7 and FIG. 7B labeling in a comparing and investigating portion 8;

FIG. 9 is a drawing to show changes of image motion vectors by conversion processing of converting portions in the multi-eye image pickup apparatus shown in FIG. 8;

FIG. 11 is a block diagram to show another embodiment of the present invention;

FIGS. 23A, 23B, and 23C are structural drawings to illustrate a problem concerning aperture correction;

DETAILED DESCRIPTION OF THE PREFERRED EMBODIMENTS

Figure 1:
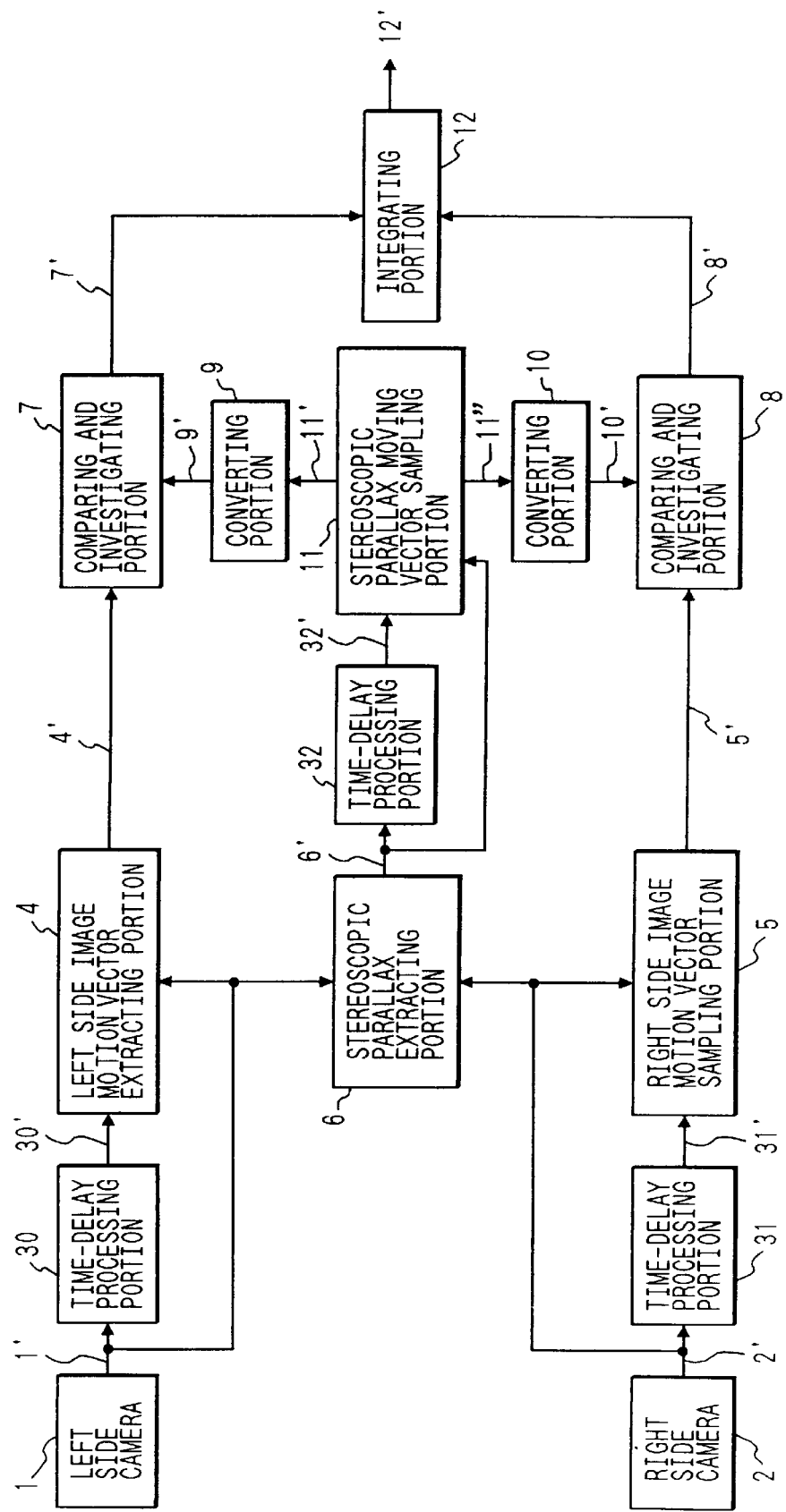
FIG. 1 is a block diagram to show schematic structure of a multi-eye image pickup apparatus of an embodiment according to the present invention.

FIG. 1 is a block diagram to show schematic structure of a part for detecting motion vectors in a multi-eye image pickup apparatus of an embodiment of the present invention.

The multi-eye image pickup apparatus of the present embodiment is provided with a motion vector detecting means for extracting motion vectors of a target object from two images obtained in time series from two cameras, camera (L) 1 and camera (R) 2. This multi-eye image pickup apparatus is arranged to obtain motion vectors of the target image from first image motion vectors obtained from the camera (L) 1, second image motion vectors obtained from the camera (R) 2, and third image motion vectors obtained from a stereoscopic parallax of the left and right cameras.

The motion vector detecting means of the above multi-eye image pickup apparatus has time delay processing portions 30, 31, 32, a left image motion vector extracting portion 4, a right image motion vector extracting portion 5, a stereoscopic parallax extracting portion 6, comparing and investigating portions 7, 8, converting portions 9, 10, a stereoscopic parallax motion vector extracting portion 11, and an integrating portion 12. These portions will be described below.

The each time delay processing portion 30, 31 performs time delay processing of Δt for an image signal 1', 2' at time t obtained from the camera (L) 1 or camera (R) 2, and outputs an image signal 30', 31' concerning the image signal 1', 2' at time (t+Δt). The time delay processing portion 32 performs time delay processing of Δt for distance information 6' output from the stereoscopic parallax extracting portion 6 as detailed later, and outputs distance information 32' concerning the distance information 6' at time (t+Δt).

The L image motion vector extracting portion 4 receives the image signal 30' output from the time delay processing portion 30 and the image signal 1' output from the camera (L) 1, extracts image motion vectors concerning camera (L) 1 between time t and time (t+Δt), and outputs L image motion vectors 4'. Similarly, the R image motion vector extracting portion 5 receives the image signal 31' output from the time delay processing portion 31 and the image signal 2' output from the camera (R) 2, extracts image motion vectors concerning the camera (R) 2 between time t and time (t+Δt), and outputs R image motion vector information 5'. The above each motion vector extracting portion performs the time delay processing for one of the two input lines, thereby increasing a processing speed and decreasing a using memory capacity.

The stereoscopic parallax extracting portion 6 receives the image signal 1' sent at time t from the camera (L) 1 and the image signal 2' sent at time t from the camera (R) 2, extracts a stereoscopic parallax concerning the image signals 1', 2', and outputs distance information 6'. This output distance information 6' includes parameters of the stereoscopic parallax and triangulation, luminance information of pixels, etc. as well as the distance information obtained from the stereoscopic parallax.

The stereoscopic parallax motion vector extracting portion 11 receives the distance information 6' at time t sent from the stereoscopic parallax extracting portion 6 and the distance information 32' at time (t+Δt) sent from the time delay processing portion 32, cross-correlationally extracts image motion vectors from the two images sent from the camera (L) 1 and camera (R) 2, and outputs stereoscopic parallax motion vectors 11', 11".

The converting portions 9, 10 receive the stereoscopic parallax motion vectors 11', 11", respectively, sent from the stereoscopic parallax motion vector extracting portion 11, convert the respective stereoscopic parallax motion vector information 11', 11" into motion vectors according to angles of convergence of the respective cameras, and output the motion vectors 9', 10', respectively.

The comparing and investigating portion 7 receives the L image motion vectors 4' sent from the L image motion vector extracting portion 4 and the motion vectors 9' sent from the converting portion 9, compares these motion vectors with each other to label them in order to discriminate mutually equal portions from mutually different portions, and outputs L image motion vector information 7' accompanied with the label information. Similarly, the comparing and investigating portion 8 receives the R image motion vectors 5' sent from the R image motion vector extracting portion 5 and the motion vectors 10' sent from the converting portion 10, and outputs R image motion vector information 8' accompanied with label information concerning these motion vector information.

The integrating portion 12 receives the L image motion vector information 7' and R image motion vector information 8' sent from the respective comparing and investigating portions 7, 8, and outputs final motion vector information 12'.

In the motion vector detecting means as described above, the two images obtained from the camera (L) 1 and camera (R) 2 include respective pixels relatively coincident on a display screen. The comparison between the left and right images and the comparison between images at respective times in each image are carried out each between relatively coincident pixels.

The operation of the multi-eye image pickup apparatus as described above is next described in detail.

In the above-described multi-eye image pickup apparatus, the camera (L) 1 and camera (R) 2 are set to have respective, predetermined angles of convergence so as to take images of a desired object. When the camera (L) 1 and camera (R) 2 take images of the object, the camera (L) 1 supplies the image signal 1' at time t to the time delay processing portion 30, the L image motion vector extracting portion 4, and the stereoscopic parallax extracting portion 6, and the camera (R) 2 supplies the image signal 2' at time t to the time delay processing portion 31, the R image motion vector extracting portion 5, and the stereoscopic parallax extracting portion 6.

The time delay processing portion 30 receiving the image signal 1' performs the time delay processing by Δt for the image signal 1' and outputs the image signal 1' at time (t+Δt) as the image signal 30'. Similarly, the time delay processing portion 31 receiving the image signal 2' outputs the image signal 2' at time (t+Δt) as the image signal 31'.

The each image signal 30', 31' output from the above each time delay processing portion 30, 31 is input into the L image motion vector extracting portion 4 or the R image motion vector extracting portion 5, respectively. On this occasion, the image signal 1' and image signal 2' from the camera (L) 1 and camera (R) 2 are input into the L image motion vector extracting portion 4 and R image motion vector extracting portion 5, respectively.

Namely, simultaneously input into the L image motion vector extracting portion 4 are the image signal 30' output at time (t+Δt) from the time delay processing portion 30 (which is the image signal output at time t from the camera (L) 1) and the image signal output at time (t+Δt) from the camera (L) 1; simultaneously input into the R image motion vector extracting portion 5 are the image signal 31' output at time (t+Δt) from the time delay processing portion 31 (which is the image signal output at time t from the camera (R) 2) and the image signal output at time (t+Δt) from the camera (R) 2.

The L image motion vector extracting portion 4 and R image motion vector extracting portion 5, each receiving the image at time t and the image at time (t+Δt), each extract image motion vectors in a period between time t and time (t+Δt). This extraction of image motion vectors in the L image motion vector extracting portion 4 and R image motion vector extracting portion 5 is detailed in the following.

Figure 2:
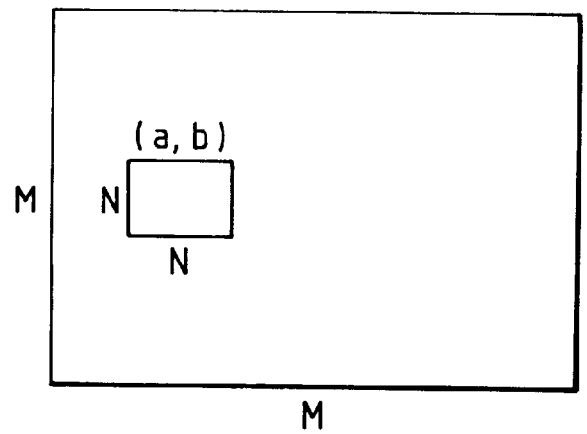
FIG. 2 is a diagrammatic drawing to illustrate extraction of image motion vector, showing that a template image of N×N pixels is extracted from an image of M×M pixels.

FIG. 2 is a diagrammatic drawing to illustrate the extraction of image motion vectors, in which a template image of N×N pixels is taken out of an image of M×M pixels.

Since the L image motion vector extracting portion 4 and R image motion vector extracting portion 5 perform the same extraction processing of image motion vectors, the extraction is described herein only as to the L image motion vector extracting portion 4.

The extraction of image motion vectors in the L image motion vector extracting portion 4 is executed in the following manner: as shown in FIG. 2, a template image of N×N pixels is cut out from a predetermined position in the image (image signal 1') of M×M pixels at time t; the template image thus cut out is moved on a search area (M−N+1)² in the image (image signal 30') of M×M pixels at time (t+Δt); search is made to obtain a position to minimize a sum of differences (absolute values) between pixels in the template image cut out and pixels in the above search area (M−N+1)². In more detail, it is made by obtaining a position of template image (position of center pixel) to minimize a residue R(a, b) given by the following equation.

$$R(a, b) = \sum_{i=0}^{n-1} \sum_{j=0}^{n-1} |I_{t+\Delta t(a,b)}(i, j) - T_t(i, j)| \qquad (19)$$

In above Equation (19), (a, b) indicates the left upper position of the template image in the image of M×M pixels; $I_{t+\Delta t(a, b)}(i, j)$ represents a moving position of the above template image in the image (image signal 30') at time (t+Δt); $T_t(i, j)$ represents a position of the template image in the image at time t (image signal 1').

Here is given a simple example of an object moving in a horizontal direction.

Figure 3A:
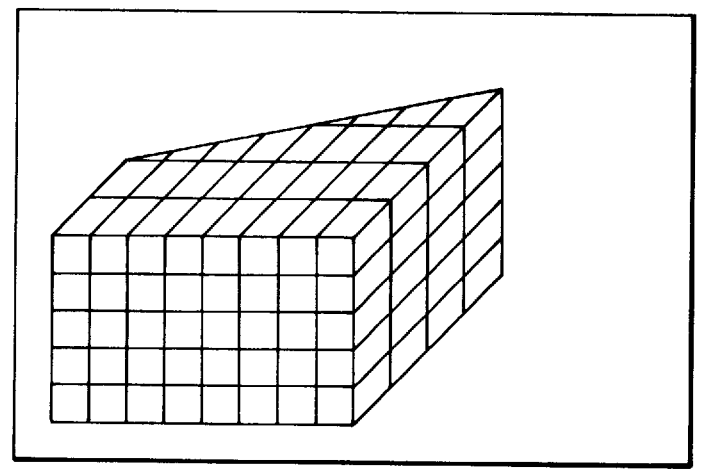
Figure 3B:
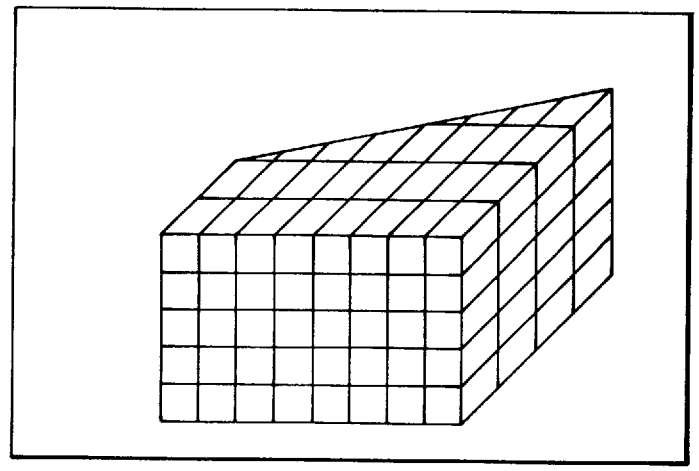
Figure 4:
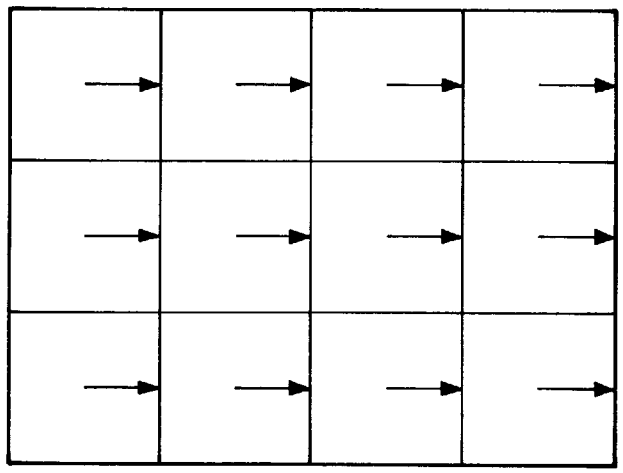
FIG. 4 is a drawing to show image motion vectors extracted based on the movement of object in FIGS. 3A and 3B, by arrows for every template image.

FIGS. 3A and 3B are drawings to show movement of an object at respective times in performing extraction of image motion vectors, wherein FIG. 3A shows an image at time t and FIG. 3B an image at time (t+Δt). FIG. 4 is a drawing to show image motion vectors extracted based on the movement of object in FIGS. 3A and 3B by arrows in the respective template images.

When the object horizontally moves as shown in FIGS. 3A and 3B, template images are first set by dividing the image shown in FIG. 3A in a predetermined size (into twelve segments herein). Then one of the template images formed on the image of FIG. 3A is first cut out, and the thus cut template image is moved on a specific search area on the image of FIG. 3B to obtain a position of template image to minimize the residue R(a, b) as defined by above Equation 19. Such processing is carried out for every template image.

Once obtaining positions of the template images to minimize the residues R(a, b) of Equation 19 as described above, arrows are drawn every pixel from Tt(i, j) to $I_{t+\Delta t(a, b)}(i, j)$ in the template images, thereby easily indicating the image motion vectors by the arrows as shown in FIG. 4. In FIG. 4, the arrows are indicated with Tt(i, j) as center coordinates of the template images.

The image motion vectors extracted in the above manner are output as L image motion vectors 4' and R image motion vectors 5' from the L image motion vector extracting portion 4 and the R image motion vector extracting portion 5, respectively.

In the above-described multi-eye image pickup apparatus, the image signals 1', 2' output from the above cameras 1, 2 are also input both into the stereoscopic parallax extracting portion 6. Next described is the extraction of stereoscopic parallax in the stereoscopic parallax extracting portion 6.

The stereoscopic parallax extraction portion 6, receiving the image signals 1', 2' from the respective cameras 1, 2, extracts a stereoscopic parallax between two left and right images at time t from the image signals 1', 2' thus received.

The stereoscopic parallax can be extracted by the same method as the technique using Equation 1 as described previously. However, the above-described technique using Equation 1 is arranged to extract image displacement vectors for images input through one camera; whereas the method herein is arranged to extract a stereoscopic parallax using the following Equation 20 from two images input from the respective cameras 1, 2.

In more detail, when the image signal 1' and image signal 2' are input into the extracting portion 6 from the camera (L) 1 and camera (R) 2, a template image is cut out from the image obtained from the image signal 2' (hereinafter referred to as R image); the template image thus cut out is moved on a search area in an image obtained from the image signal 1' (hereinafter referred to as L image); extraction is made by obtaining a position of a template image (a position of a center pixel in the template image) to minimize the residue R(a, b) given by the following equation. Here is described the example in which the template image for reference is cut out from the R image, but the reference template image may be obtained from the L image in contrast.

$$R(a, b) = \sum_{i=0}^{n-1} \sum_{j=0}^{n-1} |I_{Lt(a,b)}(i, j) - T_{Rt}(i, j)| \quad (20)$$

Since a position of the center pixel of the template image in the R image and a position of the center pixel of the template image in the L image as obtained in the above manner indicate corresponding points in the R image and L image, letting the corresponding points be (XR, YR) and (XL, YL), the stereoscopic parallax (U, V) is expressed as follows.

(U, V)=(XR, YR)−(XL, YL)

The stereoscopic parallax can be obtained in the above manner.

The stereoscopic parallax may also be obtained using the following equation instead of Equation 20.

$$R(a, b) = \sum_{i=0}^{n-1} \sum_{j=0}^{n-1} \frac{\{I_{t(a,b)}(i, j) - \bar{I}\}\{T(i, j) - \bar{T}\}}{\sqrt{IT}} \quad (21)$$

$$\bar{I} = \frac{1}{N^2} \sum_{i=0}^{n-1} \sum_{j=0}^{n-1} I_{t(a,b)}(i, j)$$

$$\bar{T} = \frac{1}{N^2} \sum_{i=0}^{n-1} \sum_{j=0}^{n-1} T(i, j)$$

$$I = \sum_{i=0}^{n-1} \sum_{j=0}^{n-1} \{I_{t(a,b)}(i, j) - \bar{I}\}^2$$

$$T = \sum_{i=0}^{n-1} \sum_{j=0}^{n-1} \{T(i, j) - \bar{T}\}^2$$

After the stereoscopic parallax is obtained in the above manner, the stereoscopic parallax extracting portion 6 further obtains distance information of a stereoscopic object, based on the principle of triangulation, from the thus obtained stereoscopic parallax, and outputs distance information 6'. The distance information 6 output on this occasion includes parameters obtained from the stereoscopic parallax and triangulation, luminance information of pixels, etc. as well as the distance information between pixels calculated.

The distance information 6' output from the stereoscopic parallax extracting portion 6 is input into the time delay processing portion 32 and also into the stereoscopic parallax motion vector extracting portion 11.

The time delay processing portion 32, receiving the distance information 6' from the stereoscopic parallax extracting portion 6, performs the time delay processing by Δt in the same manner as in the time delay processing portions 30, 31 as described previously, and outputs the distance information 6' at time (t+Δt) as distance information 32' to the stereoscopic parallax motion vector extracting portion 11.

The stereoscopic parallax moving vector extracting portion 11, to which the distance information 32' is output from the time delay processing portion 32, receives the distance information at time t (which is the distance information 32') and the distance information at time (t+Δt) (which is the distance information 6' at time (t+Δt) as directly input from the stereoscopic parallax extracting portion 6). Next described is the extraction of image motion vectors in the stereoscopic parallax motion vector extracting portion 11.

The extraction of image motion vectors can be made by the same method as the technique using Equation 19 as described previously. However, image motion vectors are extracted herein using the following equation.

$$R'(a, b) = \sum_{i=0}^{n-1} \sum_{j=0}^{n-1} \{|P_t(i, j) - P_{t+\Delta t}(i, j)| + \lambda |Q_t(i, j) - Q_{t+\Delta t}(i, j)|\} \quad (22)$$

In above Equation 22, P is a luminance value at time t of pixel (i, j); Q is distance information; pixel i, j is a distance as defined by the following equation from the lens center or the origin as defined at a certain point.

$$r = \sqrt{x_0^2 + y_0^2 + z_0^2}$$

The distance information 6' output from the stereoscopic parallax extracting portion 6 includes the distance (stereoscopic parallax) information between corresponding pixels between images in the R image and L image and the image information such as luminance information of pixels in images at respective times, as described previously, and the stereoscopic parallax motion vector extracting portion 11 extracts image motion vectors using the stereoscopic information between time t and time (t+Δt) by the distance information and luminance information.

In detail, comparison is made between luminance values of pixels by the first term of Equation 22, comparison is made between distance information (stereoscopic parallax) by the second term, and image motion vectors are extracted by obtaining R' (a, b) to minimize absolute values of these.

When the stereoscopic parallax motion vector extracting portion 11 has extracted image motion vectors from time t to time (t+Δt) concerning a stereoscopic image between the R image and the L image in the above-described manner, the stereoscopic parallax motion vector extracting portion 11 outputs stereoscopic parallax image motion vectors 11', 11" to the converting portions 9, 10, respectively.

When the stereoscopic parallax image motion vectors 11', 11" are input into the respective converting portions 9, 10, the converting portions 9, 10 perform a process to convert the stereoscopic parallax image motion vectors concerning the stereoscopic image between the R image and the L image into motion vectors concerning the R image and into motion vectors concerning the L image, respectively. The conversion process in the converting portions is next described.

Figure 5:
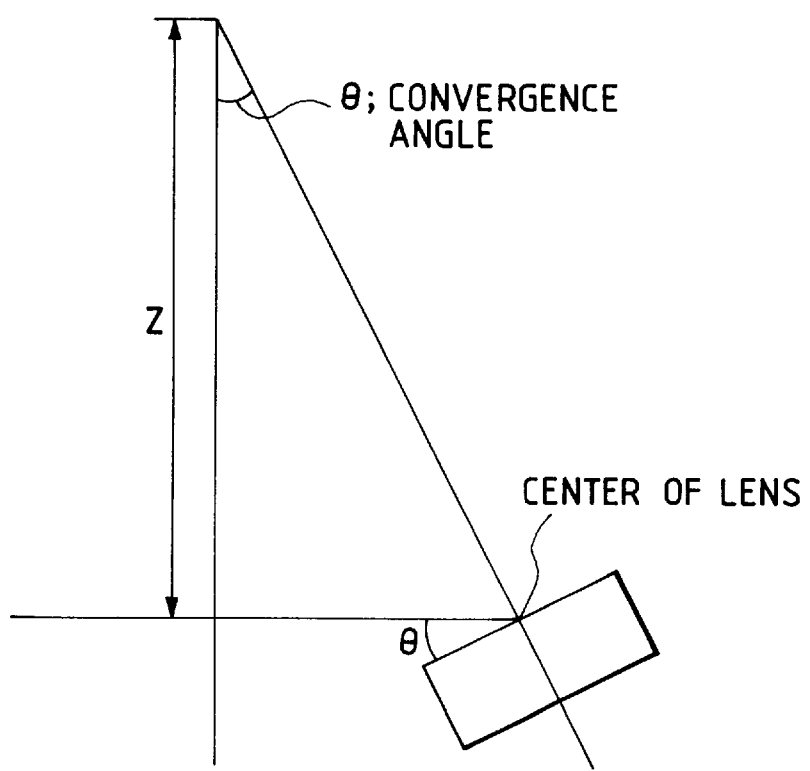
FIG. 5 is a drawing for illustrating conversion processing in converting portions, indicating a state diagram to show an angle of convergence of a camera shown in FIG. 1.

FIG. 5 is a drawing to illustrate the conversion process in the converting portions 9, 10, which is a state diagram to show an angle of convergence of the camera shown in FIG. 1.

The each converting portion 9, 10 performs the conversion process from the angle of convergence in the camera (L) 1 or camera (R) 2, as shown in FIG. 5, and there are two conceivable examples of the conversion method as described below.

One of them is a method of approximation by simple conversion of magnitude of image motion vector, which is used for the cases where the convergence angle θ of camera shown in FIG. 5 is small and the distance Z from the center of the base line to the object is very long as compared with the focal length of lens. This method uses the following equation.

$$\begin{bmatrix} u \\ v \end{bmatrix} = \begin{bmatrix} a & b \\ c & d \end{bmatrix} \begin{bmatrix} x \\ y \end{bmatrix} + \begin{bmatrix} e \\ f \end{bmatrix}$$

The other method is a method of approximation by conversion of magnitude of image motion vector based on the image information of each pixel, which uses the following equation.

$$\begin{bmatrix} u \\ v \\ w \end{bmatrix} = \begin{bmatrix} a' & b' & c' \\ d' & e' & f' \\ g' & h' & i' \end{bmatrix} \begin{bmatrix} x \\ y \\ z \end{bmatrix} + \begin{bmatrix} j' \\ k' \\ l' \end{bmatrix}$$

In the latter case, approximation is made by conversion based on the distance information of each pixel, for example using the following matrix:

$$\begin{bmatrix} a' & b' & c' \\ d' & e' & f' \\ g' & h' & i' \end{bmatrix} = \begin{bmatrix} 1 & 0 & 0 \\ 0 & \cos\omega & -\sin\omega \\ 0 & \sin\omega & \cos\omega \end{bmatrix} \begin{bmatrix} \cos\phi & 0 & \sin\phi \\ 0 & 1 & 0 \\ -\sin\phi & 0 & \cos\phi \end{bmatrix} \times$$

$$\begin{bmatrix} \cos\chi & -\sin\chi & 0 \\ \sin\chi & \cos\chi & 0 \\ 0 & 0 & 1 \end{bmatrix}$$

where (ω, φ, χ) is a rotational angle about three axes of the X, Y, Z axes;

and a translation component as described below.

$$\begin{bmatrix} j' \\ k' \\ l' \end{bmatrix}$$

FIG. 6 is a drawing to show changes of image motion vectors by the conversion process of the converting portions, which shows in a similar fashion to FIG. 4 image motion vectors when the magnitudes of image motion vectors 11', 11" are converted using either one of the above-described techniques. In the converting portions, as described above, the motion vectors obtained from the stereoscopic image are converted into motion vectors corresponding to the R image and L image, as shown in FIG. 6.

After completion of the conversion process in the converting portions 9, 10 as described above, the converting portions 9, 10 output motion vectors 9' and motion vectors 10' corresponding to the L image and the R image to the comparing and investigating portions 7, 8, respectively.

The each comparing and investigating portion, to which the motion vectors 9', 10' are output, compares motion vectors concerning the R image and the L image as converted in the above each converting portion (image motion vectors cross-relationally obtained) with image motion vectors extracted for each of R image and L image (image motion vectors auto-correlationally obtained), and provides matching portions and non-matching portions with respectively determined labels.

Namely, the comparing and investigating portion 7 performs comparison for every template image between the L image motion vector 4' output from the L image motion vector extracting portion 4 and the motion vector 9' output from the converting portion 9, and then performs the above labeling. Similarly, the comparing and investigating portion 8 performs comparison for every template image between the R image motion vector 5' and the motion vector 10', and then performs the labeling.

FIGS. 7A and 7B show an example of labeling, 'T' for matching portions and 'F' for non-matching portions, wherein FIG. 7A shows the labeling in the comparing and investigating portion 7 and FIG. 7B the labeling in the comparing and investigating portion 8.

After completion of the labeling in the comparing and investigating portions 7, 8 as shown in FIGS. 7A and 7B, the comparing and investigating portion 7 outputs the label information of FIG. 7A together with the L image motion vectors 4' and motion vectors 9' (in the form of L image motion vector information 7') to the integrating portion 12, and the comparing and investigating portion 8 outputs the label information of FIG. 7B together with the R image motion vectors 5' and motion vectors 10' (in the form of R image motion vector information 8') to the integrating portion 12.

When the integrating portion 12 receives the L image motion vector information 7' and the R image motion vector information 8', the integrating portion 12 obtains final image motion vectors based on the label information in the following manner.

First, comparison is made for every corresponding template images between the label information attached to the L image motion vector information 7' and the label information attached to the R image motion vector information 8' (the labels of FIG. 7A are compared with those of FIG. 7B herein).

When the above comparison result shows that corresponding template images both have the label 'T', a mean value or weighted mean of image motion vectors 7', 8' is taken to obtain a final image motion vector. On this occasion, distance information and luminance information of pixels as converted from the image motion vectors is also determined by taking a mean or weighted mean thereof.

If one of corresponding template images has the label 'T' and the other has the label 'F', the image motion vector with label of 'T' is employed; if both have the label 'F', the image motion vector of either one image (say, image motion vector 7') is employed so as to obtain a final image motion vector.

In the case of employing the image motion vector of either one template image, it is also possible that determination is deferred this time and a final image motion vector is determined when a result at a next time is obtained.

As described above, the final image motion vectors are obtained in such a manner that the image motion vectors based on a stereoscopic parallax obtained from the R image and L image every template image are compared with the image motion vectors for each R or L image every template image of a predetermined size and that portions matching with the image motion vectors based on the stereoscopic parallax are selected with priority.

As described above, the motion vector detecting means in the multi-eye image pickup apparatus of the present embodiment performs the above-described processes between specified frames to obtain image motion vectors.

The multi-eye image pickup apparatus of the above-described embodiment is so arranged that the stereoscopic parallax image motion vectors extracted from the stereoscopic parallax of R image and L image are converted into those of R image and L image according to the convergence angles of cameras and that comparison is made between the thus converted image motion vectors and the image motion vectors of the R image and L image extracted for the respective cameras, but in the opposite way the final motion vectors can also be obtained in such a manner that image motion vectors are extracted from each of the R image and L image, that the thus extracted image motion vectors of two images are converted into stereoscopic parallax image motion vectors according to the convergence angles of cameras, and that the stereoscopic parallax image motion vectors thus converted are compared with stereoscopic parallax image motion vectors extracted from the stereoscopic parallax of R image and L image to obtain final motion vectors. An embodiment of such a multi-eye image pickup apparatus is next described.

Figure 8:
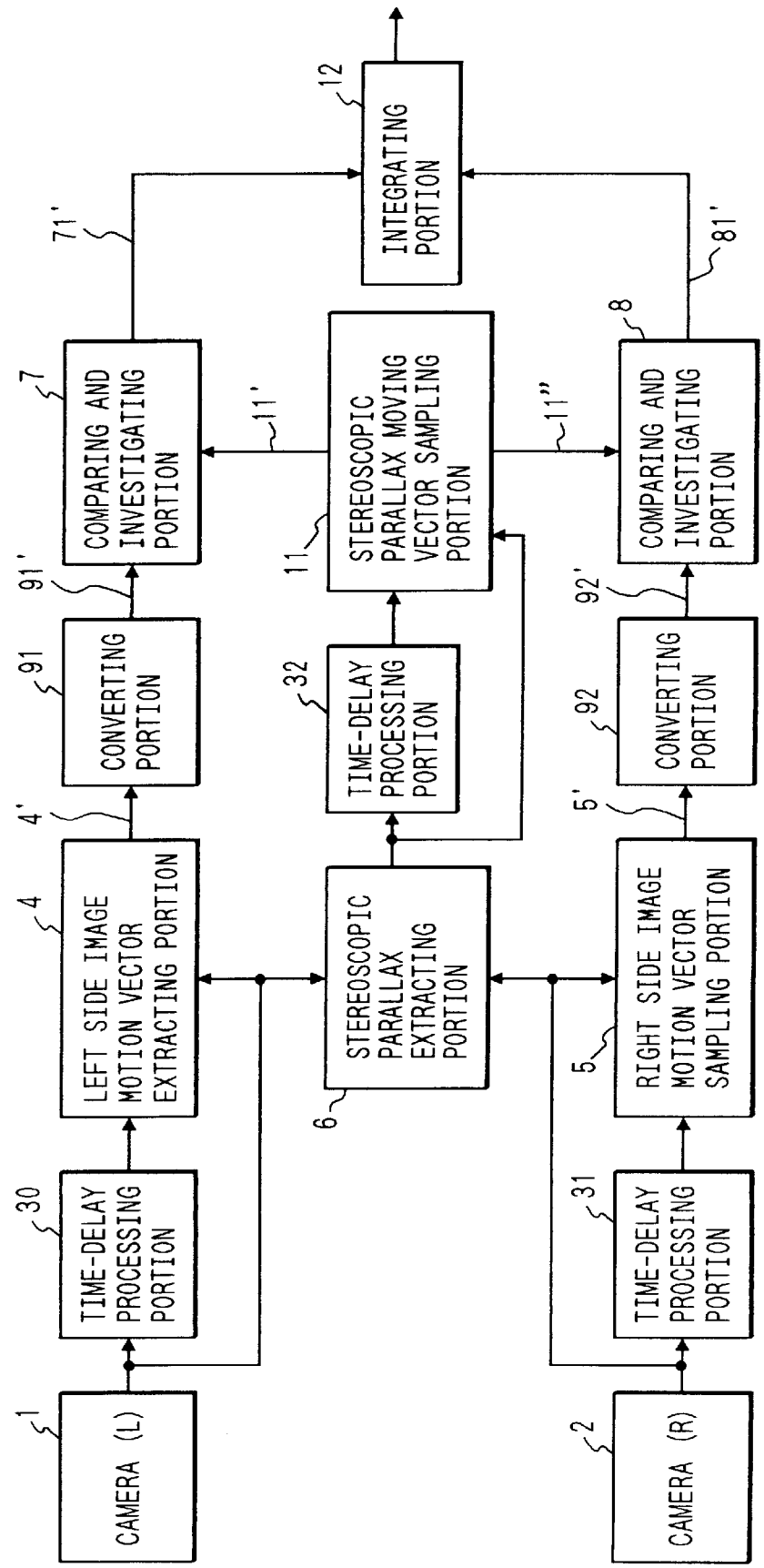
FIG. 8 is a block diagram to show schematic structure of a multi-eye image pickup apparatus of another embodiment according to the present invention.

FIG. 8 is a block diagram to show schematic structure of a part for detecting motion vectors in the multi-eye image pickup apparatus of another embodiment of the present invention.

The multi-eye image pickup apparatus of the present embodiment is constructed in the same structure as the multi-eye image pickup apparatus of the previous embodiment except that the converting portions 9, 10 in the multi-eye image pickup apparatus of the embodiment shown in FIG. 1 are replaced by converting portions 91, 92 disposed in the lines of the image motion vectors 4', 5', respectively. In FIG. 8, like constituent portions as those in FIG. 1 are denoted by the same reference numerals.

The multi-eye image pickup apparatus of the present embodiment is so arranged, similarly as in the previous embodiment, that the L image motion vectors 4' are output from the L image motion vector extracting portion 4, the R image motion vectors 5' are output from the L image motion vector extracting portion 5, and the stereoscopic parallax image motion vectors 11', 11" are output from the stereoscopic parallax motion vector extracting portion 11.

The L image motion vectors 4' output from the L image motion vector extracting portion 4 are input into the converting portion 91, and the R image motion vectors 5' output from the R image motion vector extracting portion 5 are input into the converting portion 92. Further, the stereoscopic parallax image motion vectors 11', 11" output from the stereoscopic parallax motion vector extracting portion 11 are input into the comparing and investigating portions 7, 8, respectively.

The converting portion 91 receiving the L image motion vectors 4' converts the L image motion vectors 4' into stereoscopic parallax motion vectors, opposite to the conversion in the previous embodiment, by the like method as the conversion process in the converting portion 9 in the previous embodiment, and outputs the stereoscopic parallax motion vectors 91' to the comparing and investigating portion 7. Similarly, the converting portion 92 receiving the R image motion vectors 5' converts the R image motion vectors 5' into stereoscopic parallax motion vectors, opposite to the conversion in the previous embodiment, and outputs the stereoscopic parallax motion vectors 92' to the comparing and investigating portion 8.

FIG. 9 shows states of the conversion process in this case in the same way as FIG. 6. As seen from FIG. 6 and FIG. 9, the converting portions 91, 92 of the present embodiment perform the conversion process opposite to that in the previous embodiment.

When the comparing and investigating portion 7 receives the stereoscopic parallax image motion vectors 91', the comparing and investigating portion 7 compares the stereoscopic parallax motion vectors 91' with the stereoscopic parallax motion vectors 11' output from the stereoscopic parallax image motion vector extracting portion 11, similarly as in the case of the previous embodiment, to label templates one by one, and outputs information of stereoscopic parallax image motion vectors 91' and stereoscopic parallax image motion vectors 11' with label information (as stereoscopic parallax motion vector information 71') to the integrating portion 12. Similarly, the comparing and investigating portion 8 outputs information of stereoscopic parallax motion vectors 92' and stereoscopic parallax motion vectors 11" with label information (as stereoscopic parallax motion vector information 81') to the integrating portion 12.

When the integrating portion 12 receives the stereoscopic parallax motion vector information 71' output from the comparing and investigating portion 7 and the stereoscopic parallax motion vector information 81' output from the comparing and investigating portion 8, the integrating portion 12 executes the process on the stereoscopic parallax image motion vector information thus input in the same manner as in the case of the previous embodiment to obtain final image motion vectors.

As described above, the multi-eye image pickup apparatus of the present embodiment performs the conversion process approximately reverse to that in the multi-eye image pickup apparatus of the previous embodiment.

The template matching method is used for extraction of correspondent points between two images (two images at two different times or R image and L image) in each motion vector extracting portion in the multi-eye image pickup apparatus of the present invention, but any other extracting method than the template matching method may be employed as long as it can extract correspondent points in each motion vector extracting portion.

Examples of other extracting methods are the correspondent point extracting method of a plurality of images as described in Japanese Patent Application No. 4-288371 (filed Oct. 27, 1992) as detailed below and the correspondent point extracting method of a plurality of images as described in Japanese Patent Application No. 4-343994 (filed Dec. 24, 1992) as detailed below.

Figure 10A:
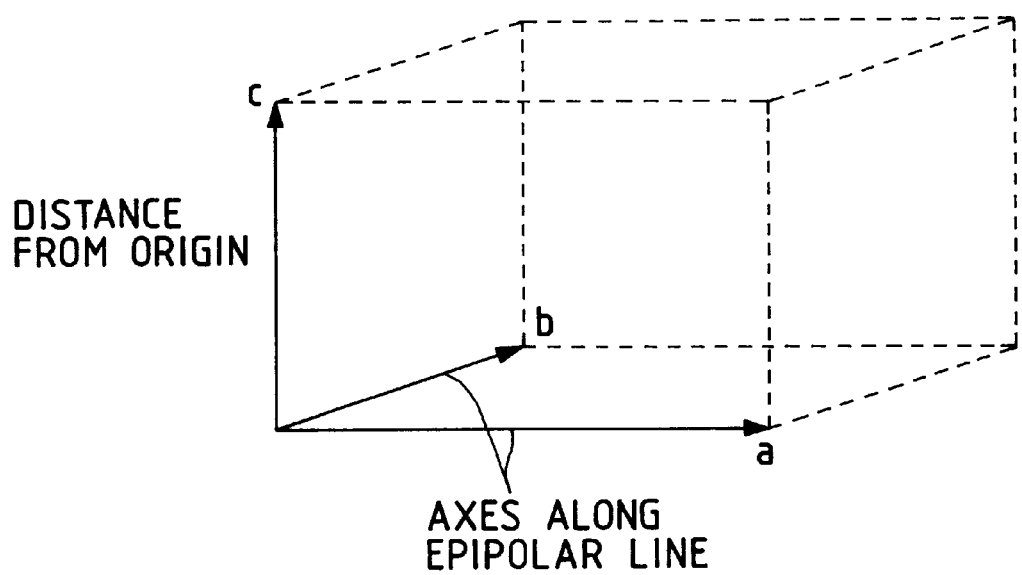
FIGS. 10A and 10B are drawings to show a three-dimensional space and an excitable region, respectively.
Figure 10B:
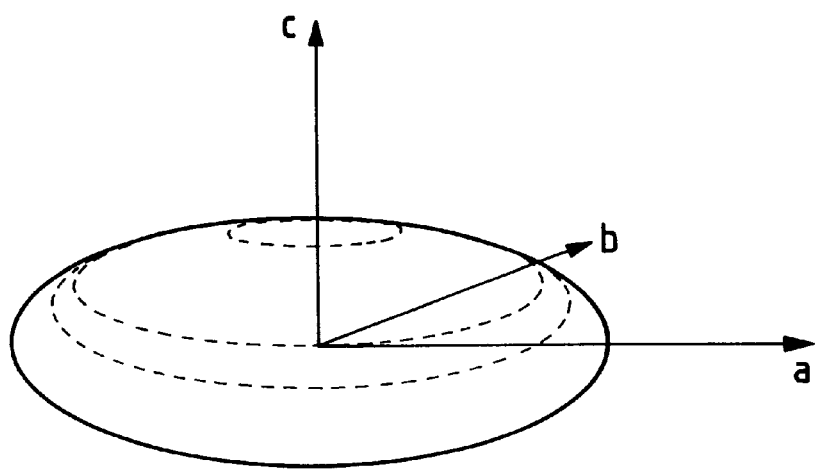

For using the correspondent point extracting method of plural images as described in the specification of the above Japanese Patent Application No. 4-343994, the stereoscopic parallax motion vector extracting portion employs the space obtained by expanding the space that the cooperation method applies three-dimensionally. The three dimensions herein mean three-dimensional directions with two axes along epipolar lines and an axis as a distance from the origin. FIGS. 10A and 10B show the three-dimensional space and excitable region.

(1) As regards the correspondent point extracting method of plural images as described in the specification of Japanese Patent Application No. 4-288371

The correspondent point extracting method of plural images as described in the above application is performed in such a manner that a parallax line is obtained by performing, at each intersecting point on a parallax screen formed by two epipolar lines extracted from two respective binary images, local operation with excitatory coupling and inhibitory coupling based on real images of the two binary images, upon extracting correspondent points between the two binary images virtual pixels indicating continuity between real pixels are provided between real pixels adjacent to each other in each binary image, and local operation with excitatory imaging and inhibitory imaging based on the virtual pixels is performed in parallel with the local operation with excitatory imaging and inhibitory imaging based on the real images, thereby extracting correspondent points.

(2) As regards the correspondent point extracting method of plural images as described in the specification of Japanese Patent Application No. 4-343994

The correspondent point extracting method of plural images as described in the above application is arranged in such a manner that a parallax line is obtained by performing, at each intersecting point on a parallax image formed from two epipolar lines extracted each from two binary images, local operation with excitatory coupling and inhibitory coupling based on real images of the two binary images and upon extracting correspondent points between the two binary images, local operation with excitatory coupling and inhibitory coupling based on the real pixels across a plurality of parallax screens is also carried out to extract correspondent points. In the local operation with excitatory coupling and inhibitory coupling based on the real images across the plurality of parallax screens, the range of excitatory coupling and the range of inhibitory coupling each are decreased for parallax screens more distant from the center parallax screen.

FIG. 11 is a drawing to show another embodiment of the present invention. In FIG. 11, reference numerals 101, 102 designate zoom lenses, 103, 104 image pickup portions, 105, 106 image memories such as field memories or frame memories, 107, 108, 109 distance-measuring portions for searching correspondent points in images to obtain a distance to an object corresponding to the corresponding points, 110 a distance data integrating portion for obtaining a weighted mean based on reliabilities of respective distance data $Z_R$, $Z_S$, $Z_L$ obtained from the distance-measuring portions 107, 108, 109, and 111 an output terminal of final distance data.

The operation by the above structure is next described. The two image pickup portions 103, 104 arranged horizontally or vertically are fixed with the optical axes thereof being in parallel with each other, and a separation between them, the so-called baseline length, is also fixed. The image pickup portions 103, 104 have synchronously operating zoom lenses 101, 102, which are set on the short focus side upon start of distance measurement to widely capture a subject (target object). After start of distance measurement, the zoom lenses 101, 102 operate to continuously change the focal length to longer focal points so as to capture the subject with a gradually increasing number of pixels.

With a small subject, the zooming can be started from a middle focal length or a long focal length from the beginning or inversely, zooming may be carried out from the long focus side to the short focus side. The way of change of zoom ratios is completely free within the scope not departing from the scope of the present invention.

The distance-measuring portions 107, 109 perform correspondence between images at different times through the respective image memories 105, 106, and further perform distance measurement according to the triangulation rule. The technique of correspondence may be any technique using image data, for example the cross-correlation method, the Fourier transformation method, etc. as well as the matching method and the gradient method as described previously.

On the other hand, the distance-measuring portion 108 performs correspondence between image pair at a same time taken from different visual points for the target object, and calculates the object distance based on the triangulation rule. The correspondence technique herein is not limited to a specific technique, either, as described above.

The distance data integrating portion 110 obtains a weighted mean based on the reliabilities of respective distance data obtained by the distance-measuring portions 107, 108, 109. For example in case of the matching method being used, the reliabilities of distance data can utilize correlation coefficient values of matching or sharpness of peak of correlation coefficient.

Now, let $Z_R$ be the distance data obtained from correspondence between time-serial images obtained in zooming of the image pickup portion 103, $Z_L$ be the distance data obtained from correspondence between the time-serial images obtained in zooming of the image pickup portion 104, $Z_S$ be the distance data obtained from correspondence between the image pickup portions 103, 104, and $k_R$, $k_L$, $k_S$ be reliabilities of the respective distance data. Then, finally resultant distance data Z can be expressed for example by the following equation.

$$Z=Z_R \cdot \{k_R/(k_R+k_L+k_S)\}+Z_L \cdot \{k_L/(k_R+k_L+k_S)\}+Z_S \cdot \{k_S/(k_R+k_L+k_S)\} \quad (23)$$

If the two image pickup portions 103, 104 are arranged horizontally, the distance measurement accuracy along a horizontal edge is generally lower than that along a vertical edge. If the two image pickup portions 103, 104 are arranged up and down, it is reverse. This means that in the stereo distance-measuring method the direction that permits high-accuracy measurement is determined by the way of arrangement of the two image pickup portions 103, 104. Thus, utilizing this directivity of accuracy, the above weighted mean of $Z_R$, $Z_L$, $Z_S$ may be taken depending upon the direction.

According to this embodiment of the present invention as described above, a combination of the two distance-measuring methods, the stereo distance-measuring method with the zoom distance-measuring method, makes secure and stable the operation of remote sensing (non-contact measurement) by image processing, which used to be originally uncertain and unstable by either of the distance-measuring methods, thereby enabling to provide three-dimensional shape measuring method and apparatus robust to a change of a characteristic of image data input and highly reliable.

Also, the present embodiment requires no large-scale drive apparatus for driving the image pickup portions 103, 104 back and forth to change the baseline length between them and can utilize the zoom function normally owned by camera, thus enabling to provide easy and high-speed three-dimensional shape measuring method and apparatus.

The present embodiment used the two image pickup portions 103, 104, but three or more image pickup portions may be used; or a single camera may be used to perform pseudo-stereo distance measurement in such a manner that first distance measurement is performed at a visual point as zooming and thereafter another distance measurement is performed again at a different visual point as zooming.

Figure 12:
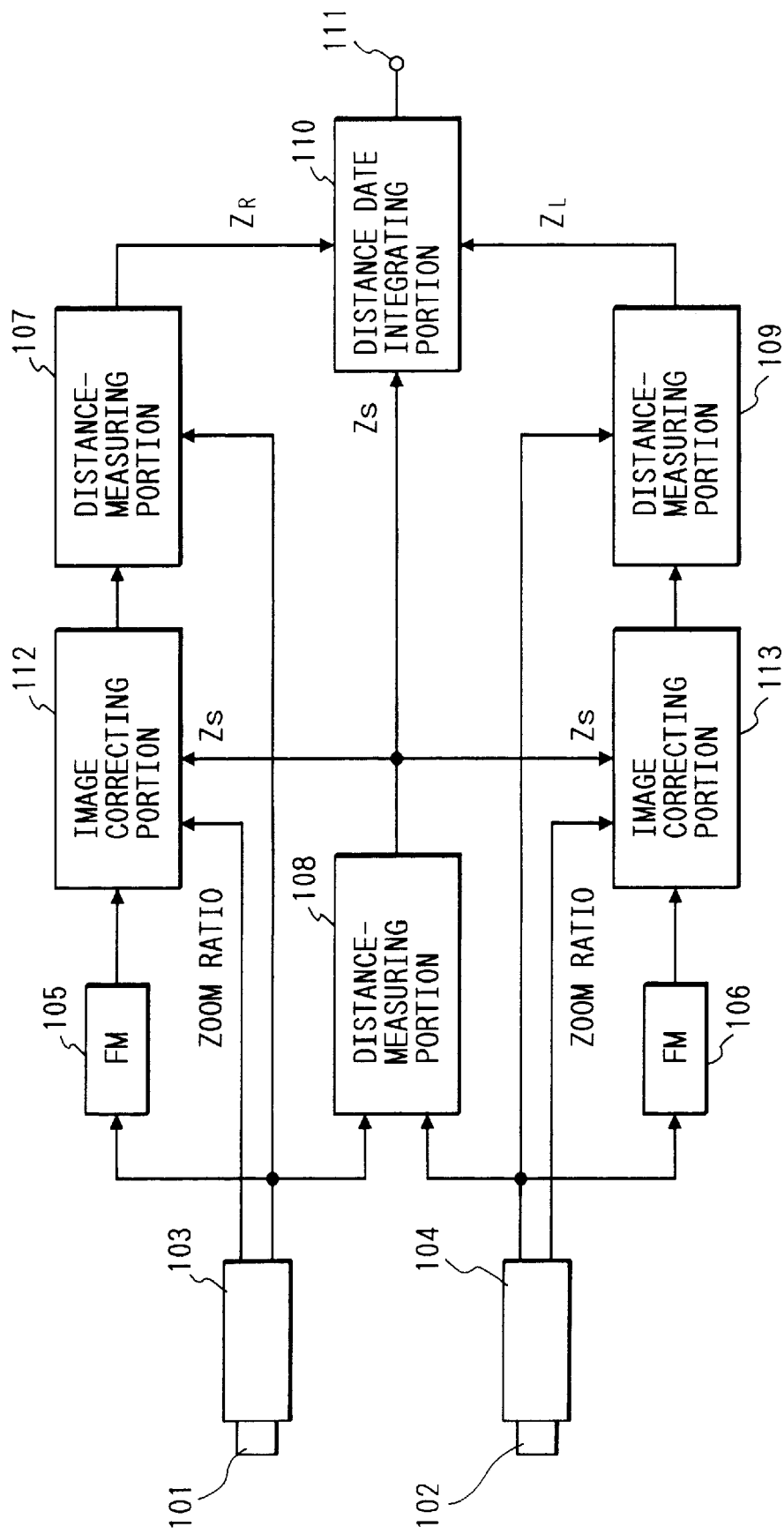
FIG. 12 is a block diagram to show another embodiment of the present invention.

FIG. 12 is a drawing to show another embodiment of the present invention, in which substantially correspondent portions to those in FIG. 11 are denoted by the same reference numerals. In FIG. 12, reference numerals 112, 113 designate image correcting portions for geometrically correcting images.

The operation is next described. The zoom lenses 101, 102 take images of the object and the image pickup portions 103, 104 generate image data. The optical axes of the two image pickup portions 103, 104 are parallel and fixed at a constant interval. Upon start of distance measurement the zoom lenses 101, 102 are set on the short focus side (wide side) with wide view angles. The two image data generated by the image pickup portions 103, 104 are input into the distance-measuring portion 108, where the correspondence process is carried out between the left and right images to measure the distance $Z_S$ to the object.

On the other hand, a line of the image memory 105, the image correcting portion 112, and the distance-measuring portion 107 and another line of the image memory 106, the image correcting portion 113, and the distance-measuring portion 109 each perform correspondence between time-serial images in zooming. The image memory 105, 106 holds an image of one field or one frame for a certain time to enable correspondence between images at different times.

The image correcting portion 112, 113 corrects the magnification of image, using the distance data $Z_S$ obtained by the distance-measuring portion 108 and a zoom ratio sent from the image pickup portion 103, 104.

Next described is the method for correcting the magnification of image.

An enlargement ratio of image can be obtained by solving simultaneous Equations (3), (4) with respect to $h_t/h_w$ as follows.

$$h_t/h_w = \{(D - f_w)/(D - f_t)\} \cdot (f_t/f_w) \quad (24)$$

$$= [\{(D - f_t) + (f_t - f_w)\}/(D - f_t)] \cdot (f_t/f_w)$$

$$= \{1 + (f_t - f_w)/(D - f_t)\} \cdot (f_t/f_w)$$

Figure 13:
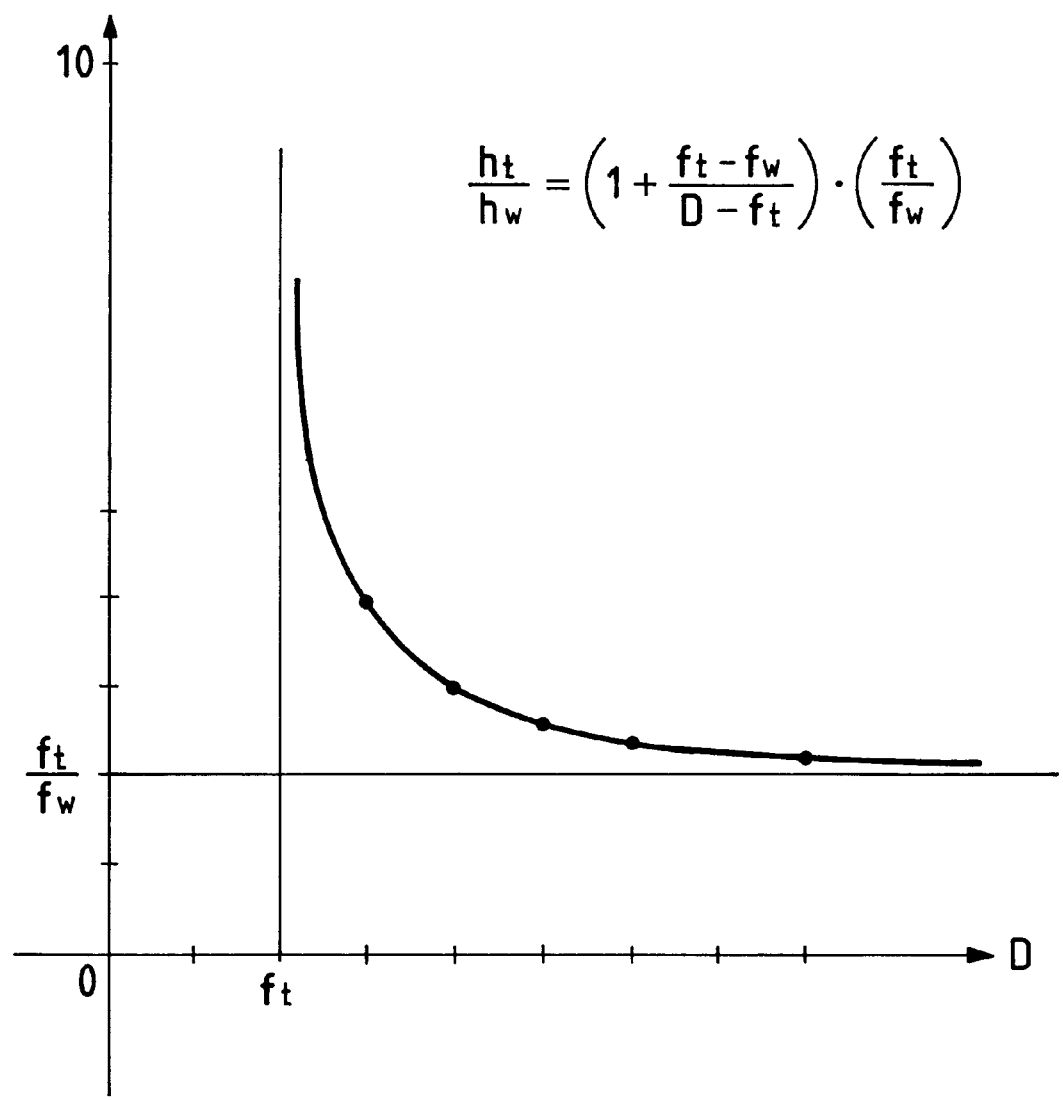
FIG. 13 is a characteristic illustration to show a relation between object distance and zoom ratio of image.

FIG. 13 shows general characteristics of the above Equation (24). It is seen that the relation between the enlargement ratio M and the object distance D is expressed by a hyperbola with asymptotic lines of $D=f_t$ and $M=h_t/h_w$.

Therefore, the magnification correction of image needs to be adaptively performed in the image correcting portions 112, 113 in accordance with Equation (24), depending upon an instantaneous zoom ratio r ($=f_t/f_w$) and object distance D.

Figure 14:
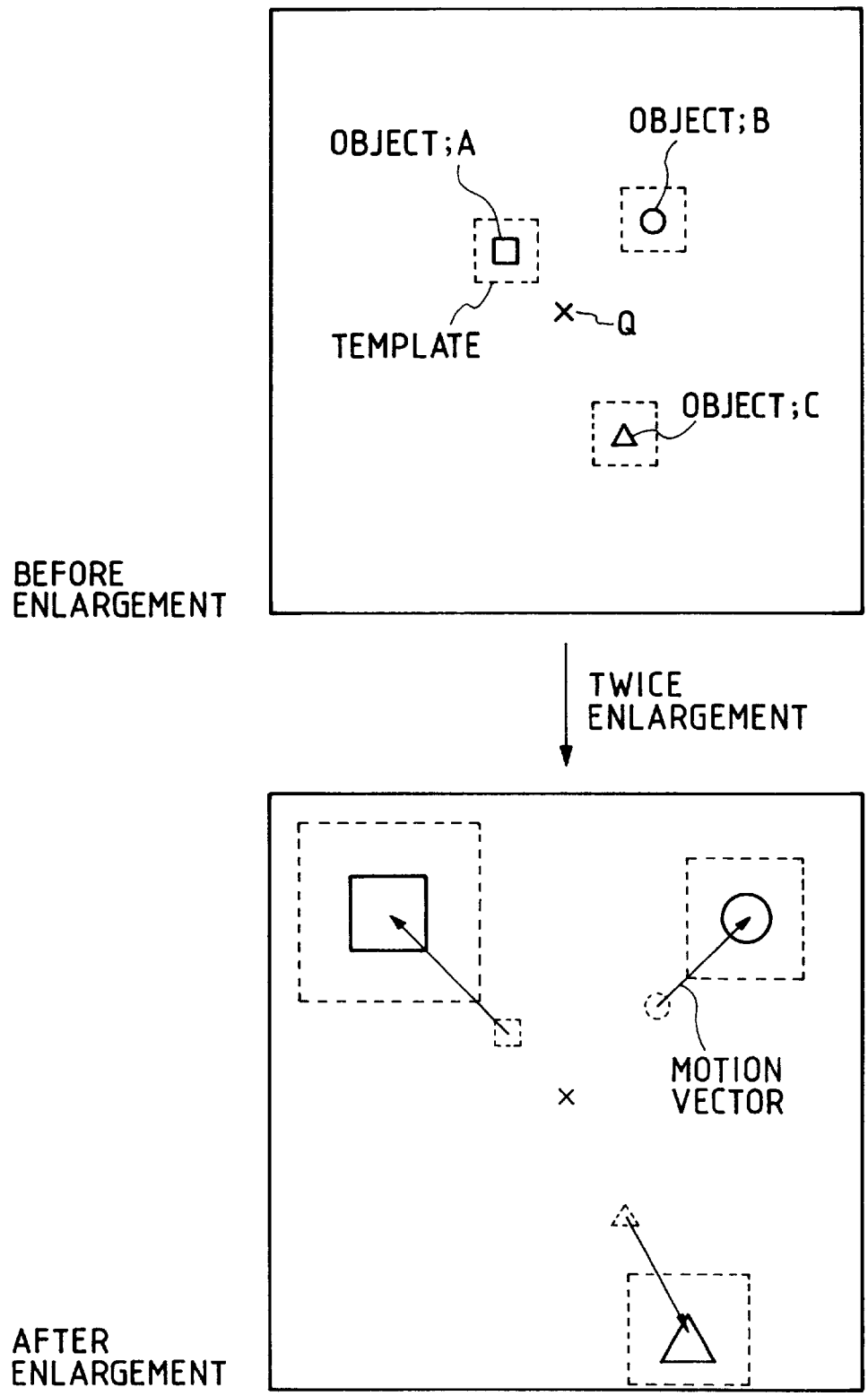
FIG. 14 is a structural drawing to show an example of enlargement in which images different in object distance are doubled.

FIG. 14 shows an example in which images are actually taken in while zooming. For simplicity, the magnification is 2 herein and only three subjects (target objects) are diagrammatically illustrated as three patterns of A, B, C. Patterns B (○), C (Δ) are target objects at far distances, for which deformation after two times zoom is dominated by that due to the zoom ratio and in which the distance from the image center Q and the size of pattern both are doubled as being nearly equal to the zoom ratio.

On the other hand, the pattern A (□) represents a target object at a near distance, for which deformation after two times zoom includes enlargement due to the near distance in addition to that due to zoom and which is further enlarged than the other patterns B (○), C (Δ).

Thus, the present embodiment uses the above Equation (24) to correct the magnification of image in accordance with the object distance D and the zoom ratio r at that instance. Specifically, the size of templates (=blocks) used in matching according to Equation (24) is enlarged for example from 5×5 pel to 7×7 pel, and then the operation of correspondence is started. Or, inversely, an image after enlarged is demagnified or thinned out according to Equation (24) so as to match with the image size before enlarged, and then correspondence is performed.

This embodiment as described above geometrically corrects a difference of magnification of image adaptively in accordance with the zoom ratio and object distance, which presents an effect of markedly improving the correspondence accuracy in the zoom distance-measuring method.

The present embodiment is specifically effective to objects at near distances for which the zoom ratio largely changes depending upon the object distance. In case of stereo distance measurement of near objects, a problem of occlusion is likely to occur because of a large parallax, but the present embodiment has a peculiar effect of enhancement of total reliability because of high reliability of the zoom distance-measuring method on that occasion.

Accordingly, the distance data integrating portion 110 can also take a weighted mean of measurement results $Z_R$, $Z_L$ by the zoom distance-measuring method and the distance measurement $Z_S$ by the stereo distance-measuring method in accordance with the object distance.

In the above-described embodiments shown in FIG. 11 and FIG. 12, the optical axes of the stereo image pickup portions were parallel. It is, however, conceivably possible that in the process of zooming the angles of view are extremely narrowed so as to result in failing to capture an object in a common field. In this case, the two image pickup portions may be arranged to be driven inward in synchronization with the zoom ratio.

Figure 15:
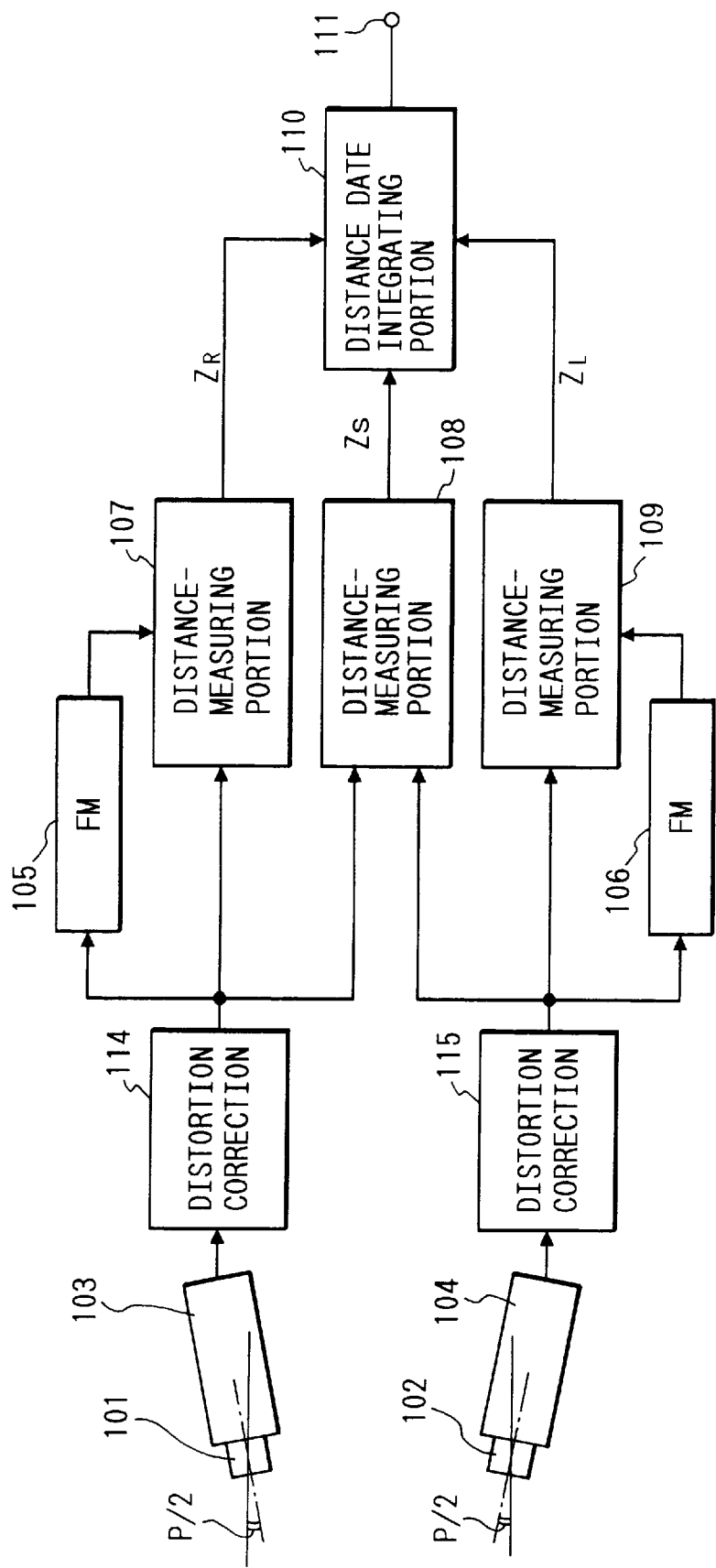
FIG. 15 is a block diagram to show another embodiment of the present invention.

FIG. 15 shows another embodiment. Differences of the present embodiment from FIG. 11 reside in that the two image pickup portions 103, 104 are directed inward to each other and in that distortion correcting portions 114, 115 for correcting distortion of image are added immediately after the image pickup portions 103, 104.

As shown in FIG. 15, images taken from two left and right (or up and down) different visual points by the image pickup portions 103, 104 will have trapezoid distortion because of intersection of optical axes. Thus, the trapezoid distortion should be corrected before image data is sent to each distance-measuring portion 107, 108, 109.

Here, let B be the baseline length of two image pickup portions 103, 104, P be an angle between the two image pickup portions 103, 104, which is an angle of convergence, (x, y) be coordinates of one image as a reference out of a plurality of input images taken, the origin (0, 0) be at the center of image, f be the focal length of taking lenses, and D be the object distance. Then a correspondence relation (u, v) of each point in a stereo image pair is expressed by the following equations.

$$u=[(-f^2) \cdot B/\{(x \cdot \sin P + f \cdot \cos P) \cdot D(x, y)\}]-[\{(f^2+x^2) \cdot \sin P\}/(x \cdot \sin P + f \cdot \cos P)] \quad (25)$$

$$v=[\{f \cdot (1-\cos P) - x \cdot \sin P\}/(x \cdot \sin P + f \cdot \cos P)] y \quad (26)$$

The first term in Equation (25) indicates an amount of parallel shift of image due to a difference between visual points of two image pickup portions 103, 104, which is irrespective of the trapezoid distortion. The trapezoid distortion is a distortion of a trapezoid shape of an image pattern caused by rotation of each image pickup portion about the optical center of the each image pickup portion. Thus, the position of the optical center is kept unchanged before and after rotation, and the baseline length B is zero. For correcting the trapezoid distortion, the first term in Equation (25) gives no contribution accordingly. Since the other terms do not include the baseline length B, they could be factors to cause the trapezoid distortion. It is seen from Equations (25), (26) that a larger distortion appears around an image with a greater value of (x, y).

The distortion correcting portion 114, 115 effects reverse correction of the terms including the convergence angle P in Equations (25), (26), thereby geometrically correcting images as if they were input through two image pickup portions with parallel optical axes.

Since this embodiment as described above is arranged to geometrically correct the trapezoid distortion of object caused by the convergence angle given between the zoom lenses 101, 102 before correspondence, the measurement accuracy can be improved for both the stereo distance-measuring method and the zoom distance-measuring method. Since each image pickup portion 103, 104 is directed to an object, more pixels can capture the subject, which enables distance measurement of finer portions of the object. Namely, this embodiment has an intrinsic effect of improving the resolution of distance measurement.

Another embodiment is next described.

With either of the above-described embodiments, the description concerned the distance data $Z_S$ obtained from correspondence of stereo images at a certain time and the distance data $Z_R$ and $Z_L$ obtained from correspondence between a time-serial image pair different in magnification. However, because images are input while continuously zooming the focal length from the wide side to the tele side, $Z_S$, $Z_R$, $Z_L$ momently obtained independently of each other can be referred to upon obtaining $Z'_S$, $Z'_R$, $Z'_L$ at a next time.

As an example of the utilizing method of distance data in the temporal direction here is described a method for applying a Kalman filter to the stereo distance-measuring method. For application of Kalman filter the distance-measuring system is formulated as follows with a reciprocal of the object distance, 1/D, as a state variable.

Signal process (characteristics of state variable)

$$(1/D)_t = (1/D)_{t-1} + \eta_t \quad (27)$$

Observation process (triangulation rule)

$$u_t = B \cdot f \cdot (1/D)_t + \xi_t \quad (28)$$

Here, $\eta_t$ is noise in signals, which corresponds to a time change of distance data 1/D. Further, $\xi_t$ is noise in a search process of correspondent point, which corresponds to a measurement error. In addition, B represents the baseline length, f the focal length, and $u_t$ a motion vector. In this case, distance information $(1/D)_t^+$ estimated by the Kalman filter is expressed by the following equation (29).

$$(1/D)_t^+ = K_t \cdot u_t + [1 - B \cdot f \cdot K_t] \cdot (1/D) \text{hd } t^- \quad (29)$$

In the above equation, $K_t$ is a Kalman gain, and $(1/D)_t^-$ is distance data presently predicted from distance data at one time before, for which the following relation holds.

$$(1/D)_t^- = (1/D)_{t-1}^+ \quad (30)$$

Here, the + symbol represents an output of Kalman filter and the − symbol a prediction value for a next time.

Figure 16:
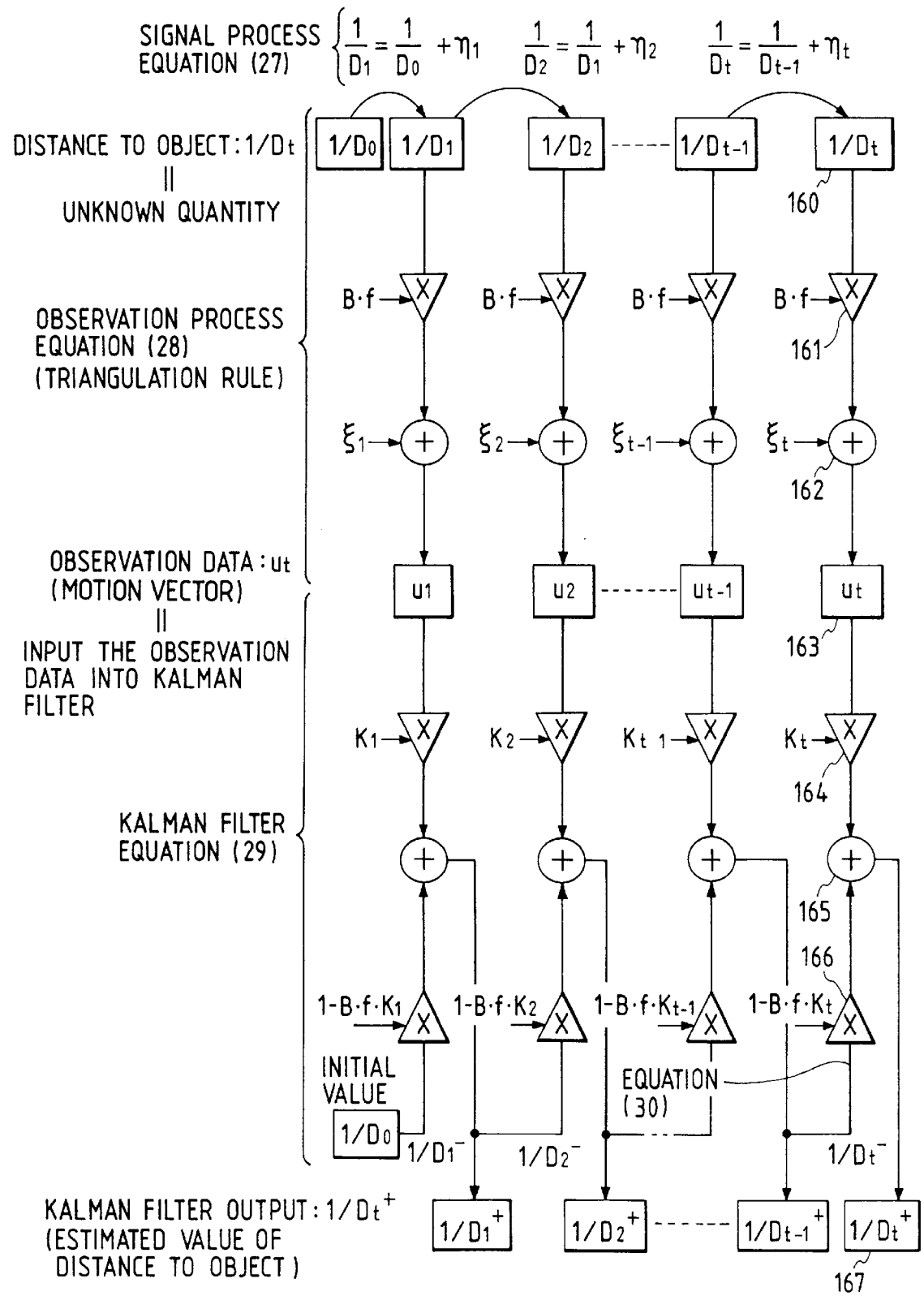
FIG. 16 is a structural drawing to illustrate the operation of a Kalman filter in an embodiment of the present invention.

FIG. 16 is a drawing to diagrammatically illustrate the above Equations (27) to (29). In the drawing, reference numeral 160 designates a signal desired to obtain by the state variable of the present distance-measuring system, which is defined as 1/(object distance). A process of time change of the state variable 160 is expressed by the above Equation (27). Numeral 161 is a multiplier, which multiplies the above state variable 160 by the baseline length B and the focal length f to obtain a moving amount (motion vector= parallax) on an image. This relation is based on the triangulation rule and is a simplified form obtained by applying the assumption of D>>f to the previously described Equation (2).

Numeral 162 denotes an adder, which adds a measurement error $\xi$ added upon obtaining the above motion vector to the moving amount. Numeral 163 is the above motion vector. Numeral 164 denotes a multiplier for multiplying the above motion vector by a Kalman gain. The Kalman gain will be described hereinafter.

Numeral 165 is an adder, which performs weighted addition of a distance estimated based on the presently observed motion vector (=parallax) and the distance estimated from the past. Numeral 166 is a multiplier for multiplying the above distance estimated from the past by a weight. Numeral 167 is distance data estimated by the Kalman filter. This distance data 167 is sequentially utilized for next distance estimation.

Next described is the Kalman gain. The Kalman gain determines weights for the distance estimated based on the currently measured motion vector and the distance estimated from the past. In the present distance-measuring system using the Kalman gain, the Kalman gain $K_t$ is expressed by the following equation.

$$K_t = (P_t^- \cdot B \cdot f) / \{(B^2 \cdot f^2 \cdot P_t^-) + R_t\} \quad (31)$$

In the equation, $$P_t^- = P_{t-1}^+ + Q_{t-1} \quad (32)$$

Here, $R_t$ is a variance of noise $\xi$ added in the observation process, $Q_t$ a variance of noise $\eta$ added in the signal process, and $P_t$ the square of a designated error, $(1/D_t - 1/D_t^+)^2$.

Supposing the measurement error $R_t$ of correspondence search is small and the accuracy of a currently observed motion vector is high, that is, if $R_t \approx 0$, the Kalman gain $K_t$ approaches $1/(B \cdot f)$ from Equation (31) and the weight on the estimate value from the past, $(1 - B \cdot f \cdot K_t)$, approaches zero. In contrast, if the value of $R_t$ becomes large, the weights are adaptively changed so as to put a higher priority on the distance estimated from the past than on the distance obtained based on the currently observed motion vector.

As described above, the Kalman filter changes a balance between the "state variable (object distance herein) estimated based on latest observation data" and the "current state variable estimated from the past progress" adaptively depending upon the reliability of the currently observed data (motion vector or parallax herein), that is, the magnitude of $R_t$, thereby obtaining always stable estimate values.

As for initial values $1/D_0$, $P_0$, which could cause a problem in applications of Kalman filter, the present invention has a merit that values obtained by the zoom distance-measuring method can be utilized as they are. Inversely, it is also possible that the Kalman filter can be applied to the zoom distance-measuring method with initial values of measurement results obtained by the stereo distance-measuring method. Also, $R_t$ to determine the Kalman gain can utilize, for example, a distribution of residues in matching operation as indicating reliability of observation data, and an example of the known technology thereof is "Kalman Filter-based Algorithms for Estimating Depth from Image Sequences" as described in International Journal of Computer Vision, 3, 209–238 (1989).

The above description concerned the example in which the Kalman filter was applied to the stereo distance-measuring method, but the Kalman filter can of course be applied to the zoom distance-measuring method in the same way.

This embodiment provides a technique for information integration in the temporal direction of distance measurement, which has such advantages that the distance measurement accuracy can be gradually enhanced without greatly increasing processing amounts and that instability due to dependence only on a currently input image can be reduced by utilizing the past distance measurement result.

Also, the distance measurement accuracy is sequentially enhanced and with also using the embodiment of FIG. 15, the resolution of distance measurement can be gradually enhanced. It is thus possible to execute operations of from high-speed capturing of a schematic contour of object to high-accuracy and high-density measurement of a three-dimensional shape of object with more time, thus realizing distance measurement with high freedom depending upon t he purpose.

Figure 17:
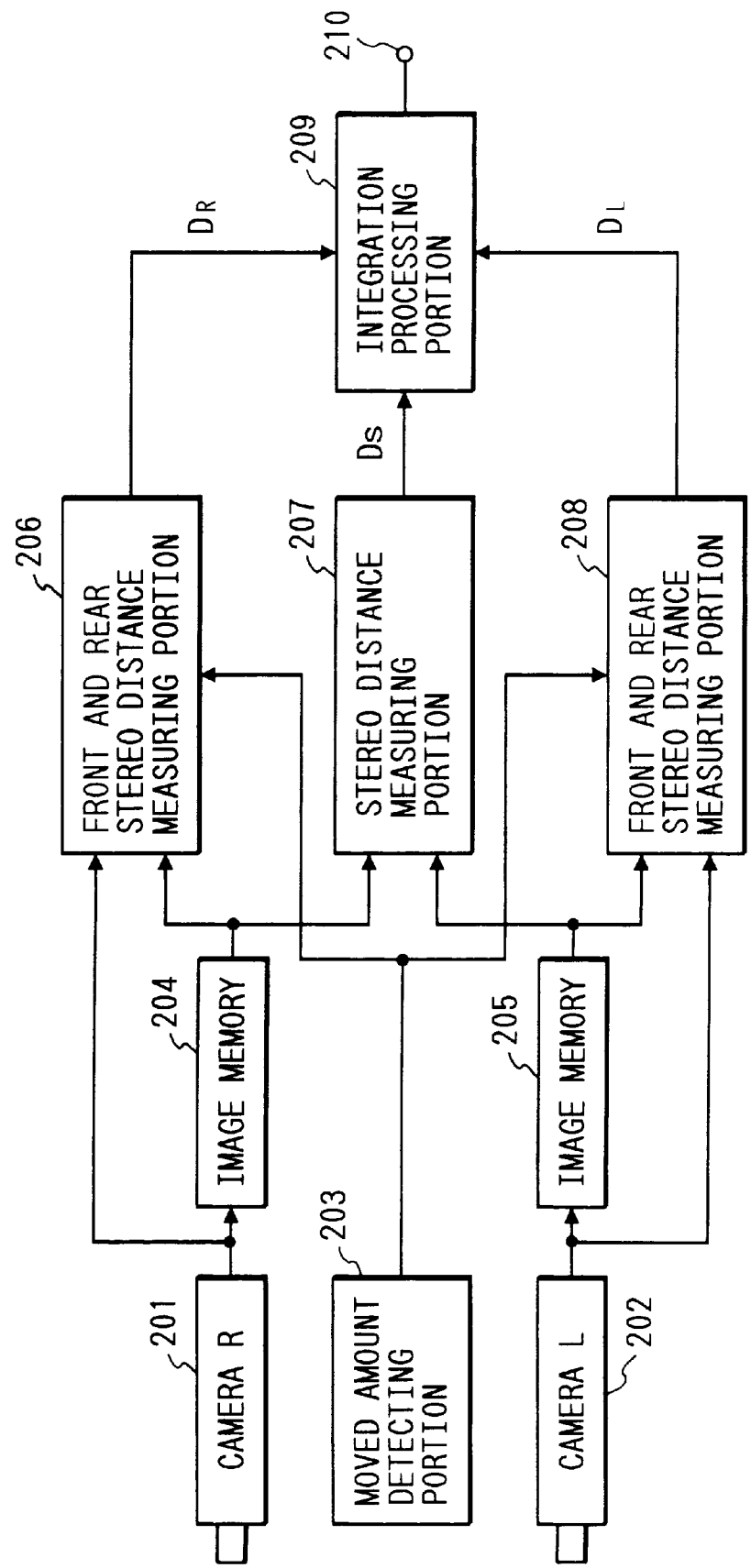
FIG. 17 is a block diagram to show another embodiment of the present invention.

FIG. 17 is a drawing best to show features of another embodiment of the present invention, which is an example in which a three-dimensional object shape recognizing apparatus of the present invention is mounted on an autonomous vehicle.

In FIG. 17, reference numerals 201, 202 designate left and right cameras as image pickup portions, 203 a moving amount detecting portion of the autonomous vehicle, 204, 205 image memories such as field memories or frame memories, 206, 208 front-to-back stereo distance-measuring portions as described previously, 207 a stereo distance-measuring portion as described previously, 209 an integration processing portion of distance measurement results, and 210 an output terminal of final distance measurement results.

The operation of FIG. 17 is next described in detail. The two cameras 201, 202 horizontally or vertically arranged are fixed so that the optical axes thereof become parallel to each other and so that the separation between them, the so-called baseline length, is also fixed. The distance-measuring portion 206, 208 performs correspondence between images at different times through the image memory 204, 205, respectively, and further performs distance measurement according to the triangulation rule of Equation (18) using a front-to-back moving amount of camera obtained by the moving amount detecting portion 203. Without a need to be limited to the matching method or the gradient method as described previously, the technique of correspondence may be any technique using the image data, such as the cross-correlation method, the Fourier transformation method, etc.

On the other hand, the distance-measuring portion 207 performs correspondence between an image pair taken at a same time from different visual points for an object, and calculates the object distance based on the triangulation rule of Equation (12). The technique of correspondence herein is not restricted to the specific technique, either, as described above.

The integration processing portion 209 takes a weighted mean of the distance data $D_R$, $D_S$, $D_L$ obtained by the distance-measuring portions 206, 207, 208, based on individual reliabilities. For example, in case of the matching method, the reliabilities of distance data can utilize correlation coefficient values of matching or sharpness of peak of correlation coefficient. Now, let $D_R$ be distance information obtained from correspondence between time-serial images during forward motion of camera 201, $D_L$ be distance information obtained from correspondence between time-serial images during forward motion of camera 202, $D_S$ be distance information obtained from correspondence between cameras 201, 202, and $k_R$, $k_L$, $k_S$ be reliabilities of the respective distance information. Then the distance D of final result can be expressed, for example, by the following equation.

$$D=[\{k_R/(k_R+k_L+k_S)\} \cdot D_R]+[\{k_L/(k_R+k_L+k_S)\} \cdot D_L]+[\{k_S/(k_R+k_L+k_S)\} \cdot D_S] \quad (33)$$

If the two cameras 201, 202 are arranged horizontally, the distance measurement accuracy along a horizontal edge is generally lower than that along a vertical edge. If the two cameras 201, 202 are arranged up and down, it is reverse. This means that in the stereo distance-measuring method the direction that permits high-accuracy measurement is determined by the way of arrangement of the two cameras. Thus, utilizing this directivity of accuracy, the above weighted mean of $D_R$, $D_L$, $D_S$ may be taken depending upon the direction of edge.

According to this embodiment of the present invention as described above, a combination of the two distance-measuring methods makes secure and stable the operation of remote sensing (non-contact measurement) by image processing, which used to be originally uncertain and unstable by either of the distance-measuring methods, thereby enabling to provide a three-dimensional shape measuring method and apparatus robust to a change of characteristics of image data input and highly reliable. The number of cameras 201, 202 may be two or more.

Figure 18:
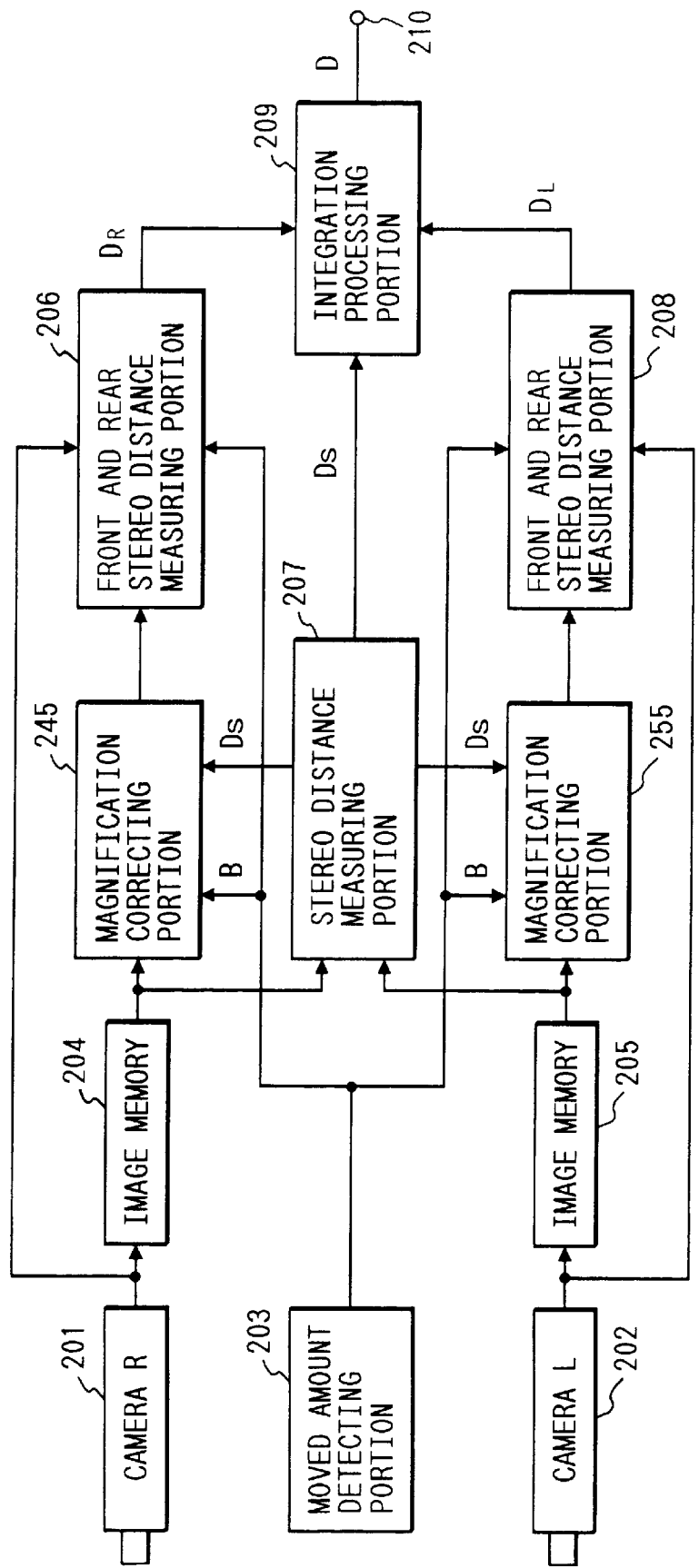
FIG. 18 is a block diagram to show another embodiment of the present invention.

FIG. 18 shows another embodiment.

This embodiment is also an embodiment in which a three-dimensional object shape recognizing apparatus according to the present invention is mounted on an autonomous vehicle to enable to recognize obstacles or roads, similarly as in the embodiment of FIG. 17. The present embodiment is constructed substantially in the same structure as the previous embodiment of FIG. 17 except that magnification correcting portions 245, 255 are newly added.

The magnification correcting portion 245, 255 corrects the magnification of image pattern, using the distance information $D_S$ as obtained by the stereo distance-measuring portion 207 and a moving amount B of the autonomous vehicle within a time for which the image memory 204, 205 holds the image data, as obtained by the moving amount detecting portion 203. The details of the magnification correction is next described. Solving the simultaneous Equations (13), (14) with respect to h/h', a magnification ratio of image pattern is obtained as follows.

$$r=h/h'=(D'-f)/(D-f) \quad (34)$$

Using D'−D=B, the following equation is derived.

$$r=h/h'=1+\{B/(D-f)\} \quad (35)$$

Figure 19:
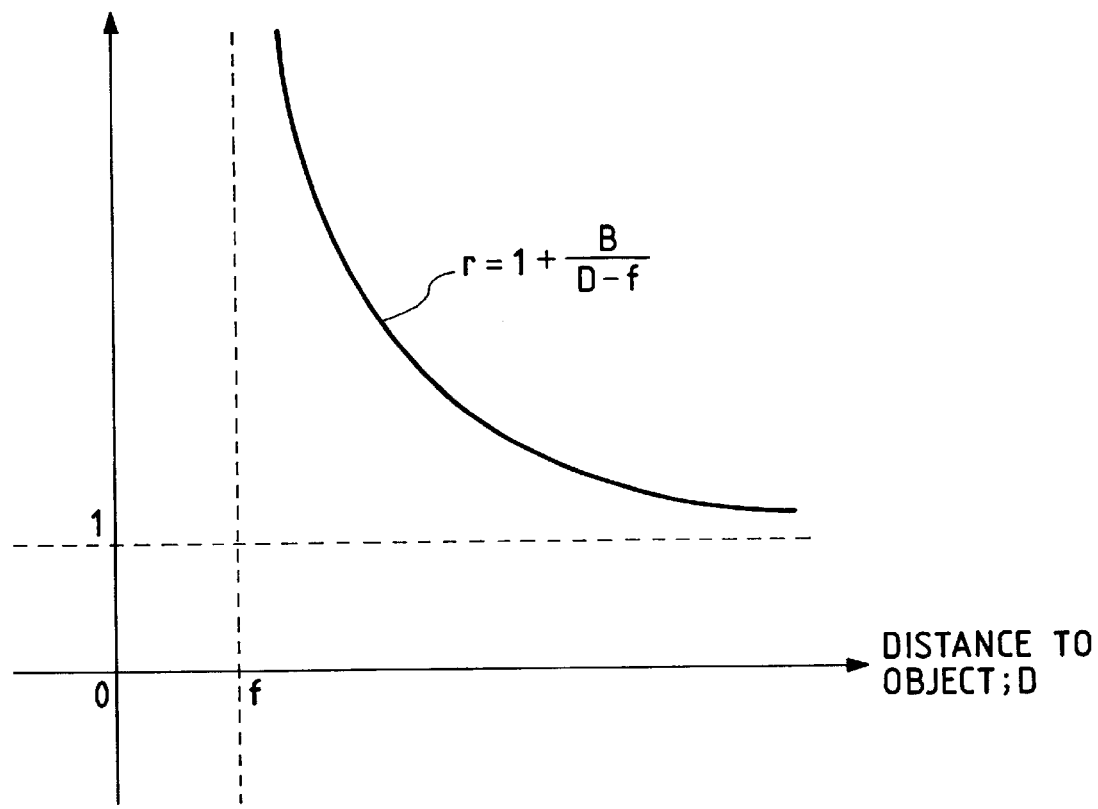
FIG. 19 is a characteristic illustration to show a relation between object distance and zoom ratio of image.

A schematic line of this equation is shown in FIG. 19. From this FIG. 19 it is understood that the relation between magnification ratio r and object distance D can be expressed by a hyperbola with asymptotic lines of D=f and r=1. This means that an object at a far distance is enlarged at a small magnification but an object at a near distance at a larger magnification. Therefore, the magnification correction of image pattern should be adaptively performed depending upon the object distance.

In the present invention, because the stereo distance-measuring portion 207 obtains the object distance $D_S$ and the moving amount detecting portion 30 obtains the amount B of forward motion (or backward motion) of the autonomous vehicle, the magnification correction of image pattern can be adaptively performed using these values $D_S$, B.

Specifically, the operation of correspondence is started after the size of templates (=blocks) used in matching is adoptively enlarged depending upon the object distance, for example from 5×5 pel to 7×7 pel, using Equation (35). Alternatively, correspondence may be started after the image after enlarged is conversely demagnified or thinned out according to Equation (35) so as to match with the image size before enlarged.

Since the difference between image magnifications is geometrically corrected in an adaptive manner depending upon the moving amount B and object distance D, this embodiment as described above has an advantage that the correspondence accuracy in the front-to-back stereo distance-measuring method can be markedly improved. The present embodiment is especially effective to objects at near distances that largely change the zoom ratio depending upon the object distance. In case of the stereo distance measurement of near objects, a problem of occlusion is likely to occur because of the great magnitude of parallax, but the present embodiment has a peculiar effect of enhancement of total reliability because it can enhance the reliability of the front-to-back stereo distance-measuring method on that occasion. Therefore, the integration processing portion 209 in the present embodiment can also take a weighted mean of measurement results $D_R$, $D_L$ by the front-back-stereo distance-measuring method and measurement result $D_S$ by the stereo distance-measuring method, depending upon the object distance.

Figure 20:
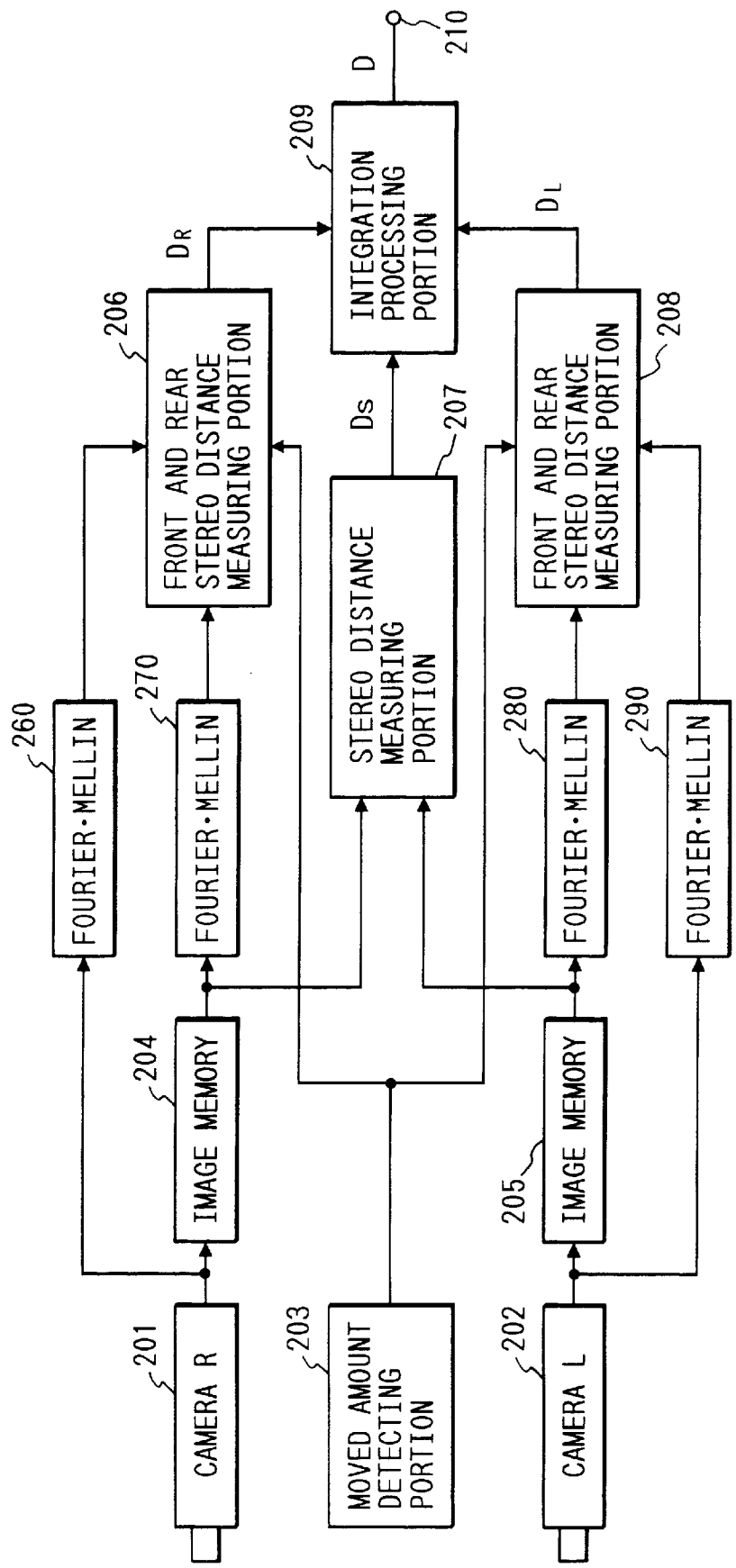
FIG. 20 is a block diagram to show another embodiment of the present invention
Figure 21:
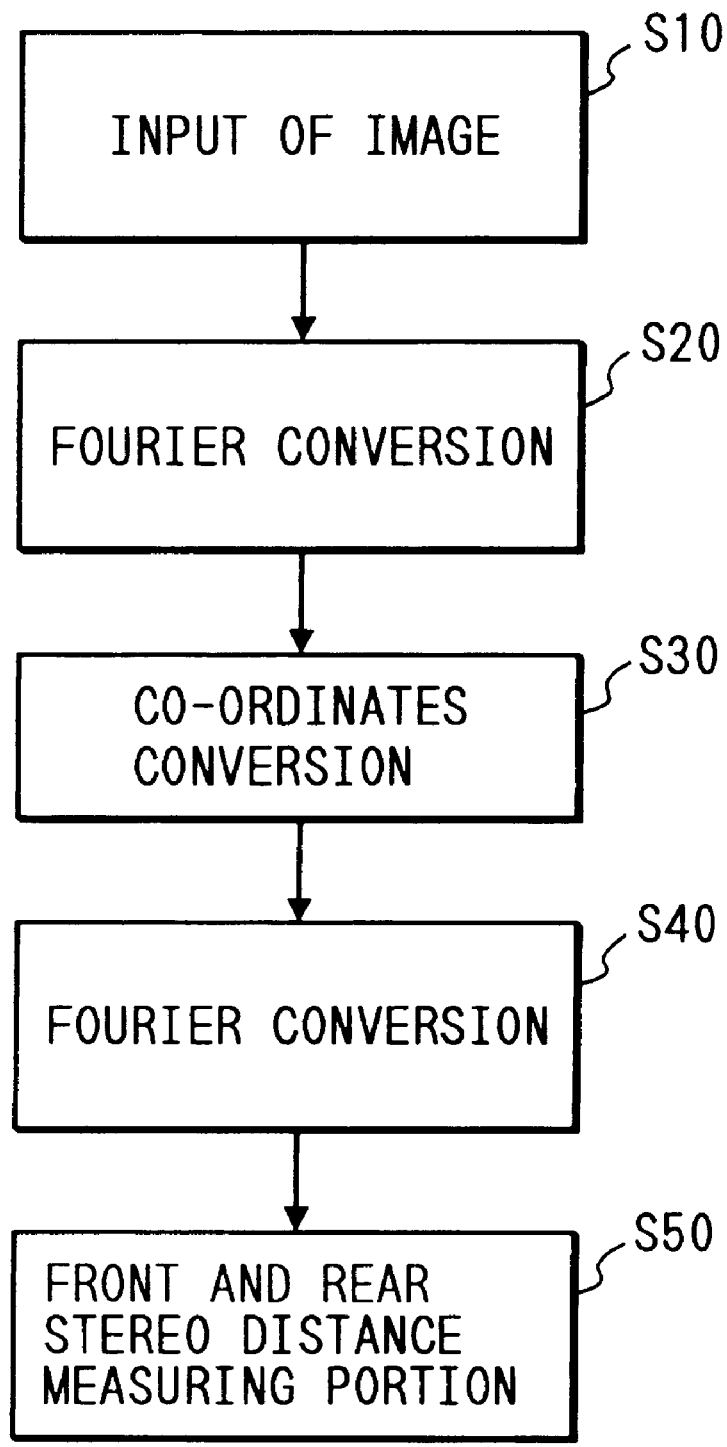
FIG. 21 is a flowchart to show the Fourier-Mellin transformation.

FIG. 20 shows another embodiment of the present invention. In FIG. 20, a difference from the embodiment of FIG. 17 resides in that Fourier-Mellin transformation portions 260, 270, 280, 290 are disposed before the front-to-back stereo distance-measuring portions 206, 208. The operation of the Fourier-Mellin transformation portions is next described referring to FIG. 21.

Image data input at step S10 is first subjected to the Fourier transformation at step S20. An amplitude (or power) of image pattern after Fourier transformation is invariant even with parallel movement of pattern; if the pattern is enlarged, for example, a times, the amplitude is demagnified at a demagnification ratio of 1/a. With rotation θ of pattern the amplitude also rotates by same θ. Then at next step S30 the amplitude image is subjected to the coordinate transformation with the vertical axis as angle of deflection and the horizontal axis as radius of logarithmic scale.

After the above coordinate transformation, the image shows parallel movement in the vertical-axis direction with rotation of the original pattern and parallel movement in the horizontal-axis direction with magnification change of the original pattern. After the amplitude is subjected again to the Fourier transformation at next step S40, it becomes invariant with rotation or magnification change of the original pattern. If correspondence is performed using this pattern in the front-to-back stereo distance-measuring portions at next step S50, it can realize distance measurement immune to rotation or magnification change of pattern.

As described above, the present embodiment has such an advantage that the accuracy of the front-to-back stereo distance-measuring method can be improved by using the Fourier-Mellin transformation for correspondence of magnification-changed pattern. Particularly, because the process is completely independent of the stereo distance-measuring portion 207 in the present embodiment, it can prevent the stereo distance measurement and the front-to-back stereo distance measurement techniques from failing together, thus presenting effects of improving the reliability and safety.

Figure 22:
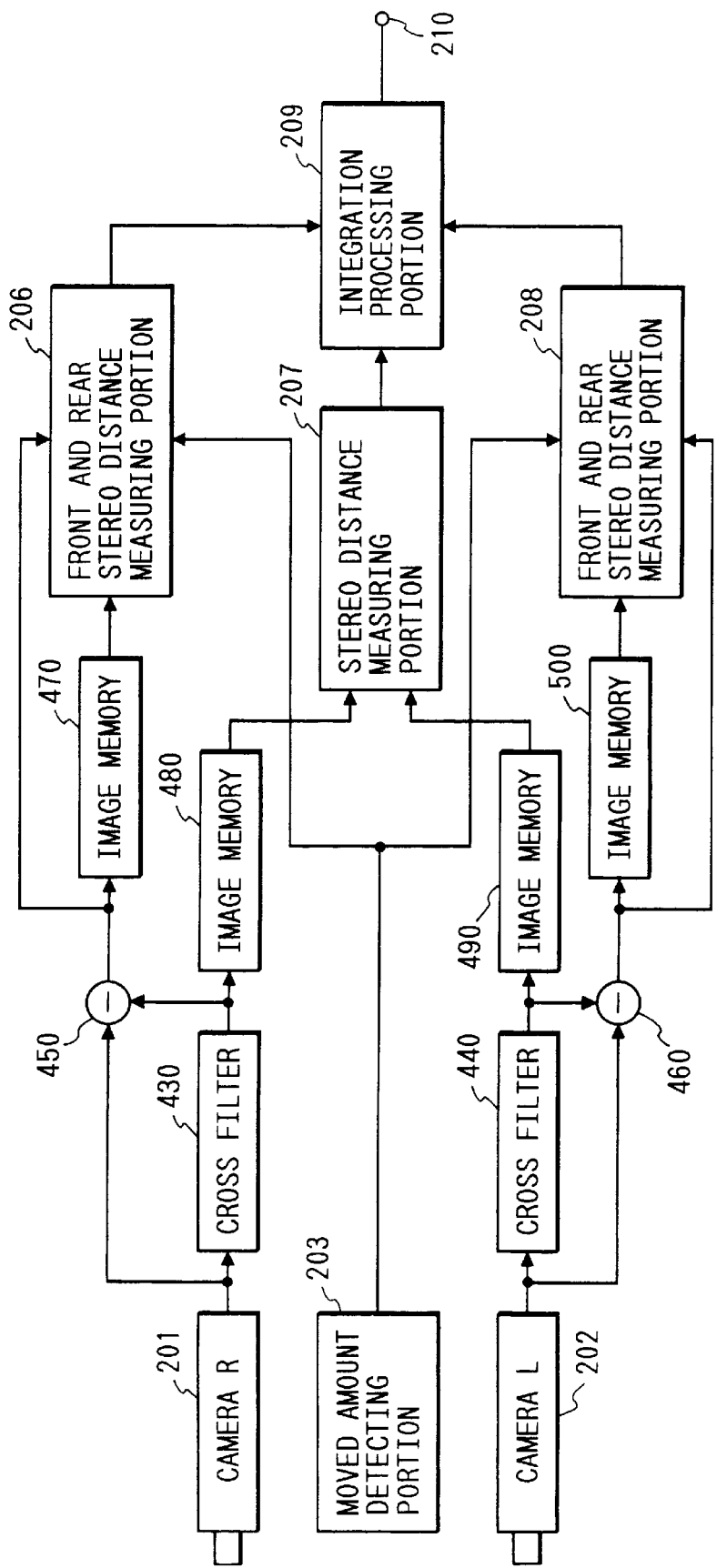
FIG. 22 is a block diagram to show another embodiment of the present invention.

FIG. 22 shows another embodiment of the present invention. In the drawing, reference numeral 203 designates a moving amount detecting portion of cameras 201, 202 in the optical-axis direction, 430, 440 cross filters for stopping oblique spatial gradient components in image data, 450, 460 subtracters each for calculating a difference between an image input thereinto without filtering and an image after filtered, and 470, 480, 490, 500 image memories.

A particularly significant difference between the present embodiment and the embodiment of FIG. 17 is that the filters 430, 440 are newly provided to supply oblique gradient components and horizontal/vertical gradient components of image to the front-to-back stereo distance-measuring portions 206, 208 and to the stereo distance-measuring portion 207, respectively. The function of filters 430, 440 is next described.

Since the stereo distance-measuring method uses two cameras 201, 202 arranged to have a same object distance and different visual points, results of correspondence between images taken in from the two cameras 201, 202 can be expressed as optical flows aligned in nearly same directions though lengths differ depending upon the object distance. For example, if the two cameras are arranged horizontally, optical flows indicating the correspondence relation of pixels between the left and right images become aligned nearly horizontally; similarly if the two cameras are arranged vertically, optical flows indicating the correspondence relation of pixels between the upper and lower images become aligned nearly vertically.

Also, optical flows indicating a correspondence relation of pixels between front and back images input before and after in the optical-axis direction through a single camera become radially distributed nearly around the image center.

Next described is an aperture problem appearing in correspondence or motion detection by image processing.

FIGS. 23A–23C show patterns in which spatial gradients are present only in horizontal, vertical, or oblique (45°) direction, respectively, and which are moved by V in the right oblique direction of 45° as shown. In case of FIG. 23A, $V_x$ can be correctly detected, but detection of $V_y$ is impossible. In case of FIG. 23B, conversely, $V_y$ can be correctly detected, but $V_x$ is impossible to detect. On the other hand, in case of FIG. 23C, both $V_x$, $V_y$ can be correctly detected.

As described, spatial gradients of image are absolute and indispensable means for correspondence or motion detection by image processing. Thus, the present embodiment has an effect of improving the distance measurement accuracy of the both techniques by supplying horizontal or vertical spatial gradients to the stereo distance-measuring portion 207 with priority and supplying oblique gradient components to the front-to-back stereo distance-measuring portions 206, 208 with priority.

The embodiment of FIG. 22 is so arranged that only oblique components are supplied to the front-to-back stereo distance-measuring portions 206, 208 and only horizontal/vertical components to the stereo distance-measuring portion 207, but in actual applications the image data can be supplied to the respective methods with moderately mixed gradients by moderating transition regions of band limits of the cross filters 430, 440. Desirably, horizontal/vertical gradients are supplied to the stereo distance-measuring method while an isotropic gradient distribution to the front-to-back stereo distance measurement. The designing method of cross filters is described in detail in "motion vector detecting apparatus," the bulletin of Japanese Laid-open Patent Application No. 4-10873 filed by the inventors.

Another embodiment is next described. In either of the above embodiments, the description concerned the distance data $D_S$ obtained from correspondence of stereo images at a certain time and distance data $D_R$ and $D_L$ obtained from correspondence between a time-serial image pair with different magnifications. However, because images are input as continuously zooming the focal length from the wide side to the tele side, $D_S$, $D_R$, $D_L$ momently obtained independently of each other can be referred to upon obtaining $D'_S$, $D'_R$, $D'_L$ at a next time.

As an example of the utilizing method of distance data in the temporal direction here is described a method for applying a Kalman filter to the stereo distance-measuring method. For application of Kalman filter the distance-measuring system is formulated as follows with a reciprocal of the object distance, 1/D, as a state variable.

Signal process (characteristics of state variable)

$$(1/D)_t = (1/D)_{t-1} + \eta_t \quad (36)$$

Observation process (triangulation rule)

$$u_t = B \cdot f \cdot (1/D)_t + \xi_t \quad (37)$$

Here, $\eta_t$ is noise in signals, which corresponds to a time change of distance data 1/D. Further, $\xi_t$ is noise in a search process of correspondent point, which corresponds to a measurement error. In addition, B represents the baseline length, f the focal length, and $u_t$ a motion vector. In this case, distance information $(1/D)_t^+$ estimated by the Kalman filter is expressed by the following equation (38).

$$(1/D)_t^+ = K_t \cdot u_t + [1 - B \cdot f \cdot K_t] \cdot (1/D)_t^- \quad (38)$$

In the above equation, $K_t$ is a Kalman gain, and $(1/D)_t^-$ is distance data presently predicted from distance data at one time before, for which the following relation holds.

$$(1/D)_t^- = (1/D)_{t-1}^+ \quad (39)$$

Here, the + symbol represents an output of Kalman filter and the − symbol a prediction value for a next time.

Figure 24:
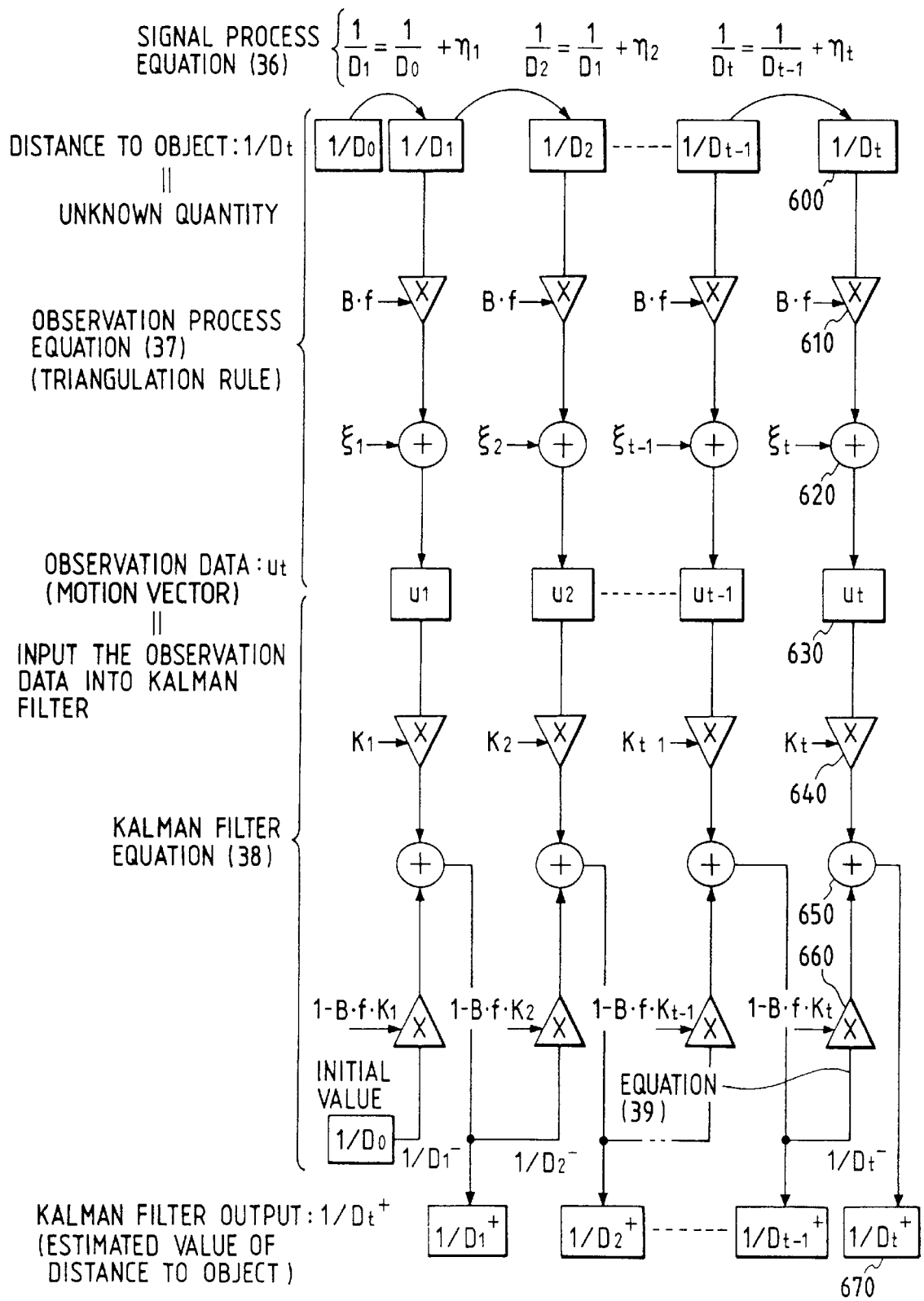
FIG. 24 is a structural drawing to show a Kalman filter used in another embodiment of the present invention.

FIG. 24 is a drawing to diagrammatically illustrate the above Equations (36) to (39). In the drawing, reference numeral 600 designates a signal desired to obtain by the state variable of the present distance-measuring system, which is defined as 1/(object distance). A process of time change of the state variable 600 is expressed by the above Equation (36). Numeral 610 is a multiplier, which multiplies the above state variable 600 by the baseline length B and the focal length f to obtain a moving amount (motion vector= parallax) on an image. This relation is based on the triangulation rule and is a simplified form obtained by applying the assumption of D>>f to the previously described Equation (12).

Numeral 620 denotes an adder, which adds a measurement error $\xi$ added upon obtaining the above motion vector to the moving amount. Numeral 630 is the above motion vector. Numeral 640 denotes a multiplier for multiplying the above motion vector by a Kalman gain. The Kalman gain will be described hereinafter.

Numeral 650 is an adder, which performs weighted addition of a distance estimated based on the presently observed motion vector (=parallax) and the distance estimated from the past. Numeral 660 is a multiplier for multiplying the above distance estimated from the past by a weight. Numeral 670 is distance data estimated by the Kalman filter. This distance data 670 is sequentially utilized for next distance estimation.

Next described is the Kalman gain. The Kalman gain determines weights for the distance estimated based on the currently measured motion vector and the distance estimated from the past. In the present distance-measuring system using the Kalman gain, the Kalman gain $K_t$ is expressed by the following equation.

$$K_t = (P_t^- \cdot B \cdot f) / \{(B^2 \cdot f^2 \cdot P_t^-) + R_t\} \quad (40)$$

In the equation, $$P_t^- = P_{t-1}^+ + Q_{t-1} \quad (41)$$

Here, $R_t$ is a variance of noise $\xi$ added in the observation process, $Q_t$ a variance of noise $\eta$ added in the signal process, and $P_t$ the square of a designated error, $(1/D_t - 1/D_t^+)^2$.

Supposing the measurement error $R_t$ of correspondence search is small and the accuracy of a currently observed motion vector is high, that is, if $R_t \approx 0$, the Kalman gain $K_t$ approaches $1/(B \cdot f)$ from Equation (40) and the weight on the estimate value from the past, $(1 - B \cdot f \cdot K_t)$, approaches zero. In contrast, if the value of $R_t$ becomes large, the weights are adaptively changed so as to put a higher priority on the distance estimated from the past than on the distance obtained based on the currently observed motion vector.

As described above, the Kalman filter changes a balance between the "state variable (object distance herein) estimated based on latest observation data" and the "current state variable estimated from the past progress" adaptively depending upon the reliability of the currently observed data (motion vector or parallax herein), that is, the magnitude of $R_t$, thereby obtaining always stable estimate values.

As for initial values $1/D_0$, $P_0$, which could cause a problem in applications of Kalman filter, the present invention has a merit that values obtained by the front-to-back stereo distance-measuring method can be utilized as they are. Inversely, it is also possible that the Kalman filter can be applied to the zoom distance-measuring method with initial values of measurement results obtained by the stereo distance-measuring method. Also, $R_t$ to determine the Kalman gain can utilize, for example, a distribution of residues in matching operation as indicating reliability of observation data, and an example of the known technology thereof is "Kalman Filter-based Algorithms for Estimating Depth from Image Sequences" as described in International Journal of Computer Vision, 3, 209–238 (1989).

The above description concerned the example in which the Kalman filter was applied to the stereo distance-measuring method, but the Kalman filter can of course be applied to the zoom distance-measuring method in the same way.

This embodiment provides a technique for information integration in the temporal direction of distance measurement, which has such advantages that the distance measurement accuracy can be gradually enhanced without greatly increasing processing amounts and that instability due to dependence only on a currently input image can be reduced by utilizing the past distance measurement result.

Also, the distance measurement accuracy is sequentially enhanced, and it is thus possible to execute operations of from high-speed capturing of a schematic contour of object to high-accuracy and high-density measurement of a three-dimensional shape of object with more time, thus realizing distance measurement with high freedom depending upon the purpose.

The present embodiment illustrates the fusion method of distance measurement data in the temporal direction with the example of Kalman filters, but any other technique that permits information integration in the temporal direction can be employed.

In the above embodiments, the optical axes of stereo image pickup portions were parallel to each other. However, in the process of running, the angles of view could become extremely narrowed so as to fail to capture a target object in a common field. In that case, the two cameras may be arranged to be driven inward in synchronization with the running speed.

Figure 25:
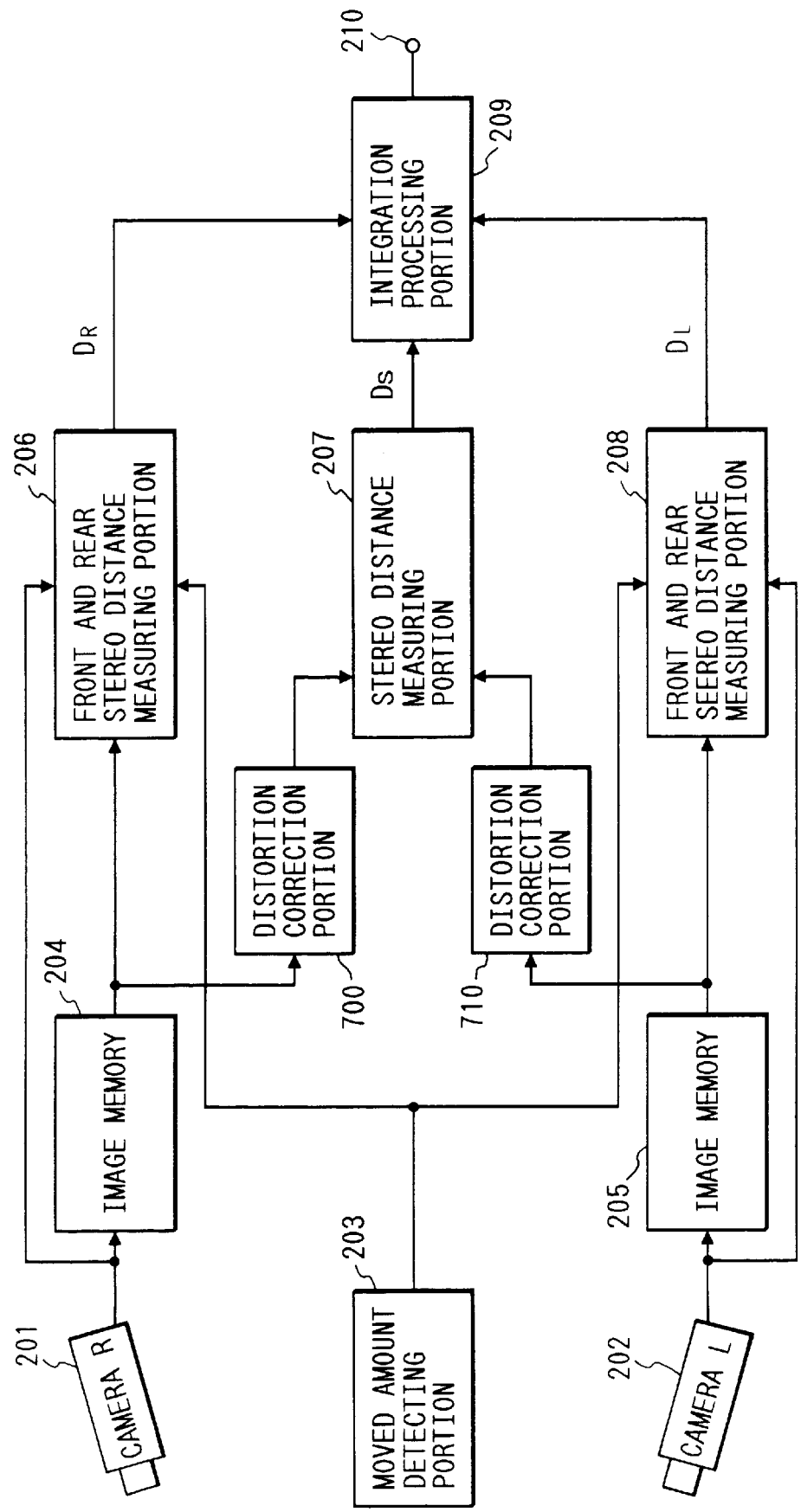
FIG. 25 is a block diagram to show another embodiment of the present invention.
Figure 26:
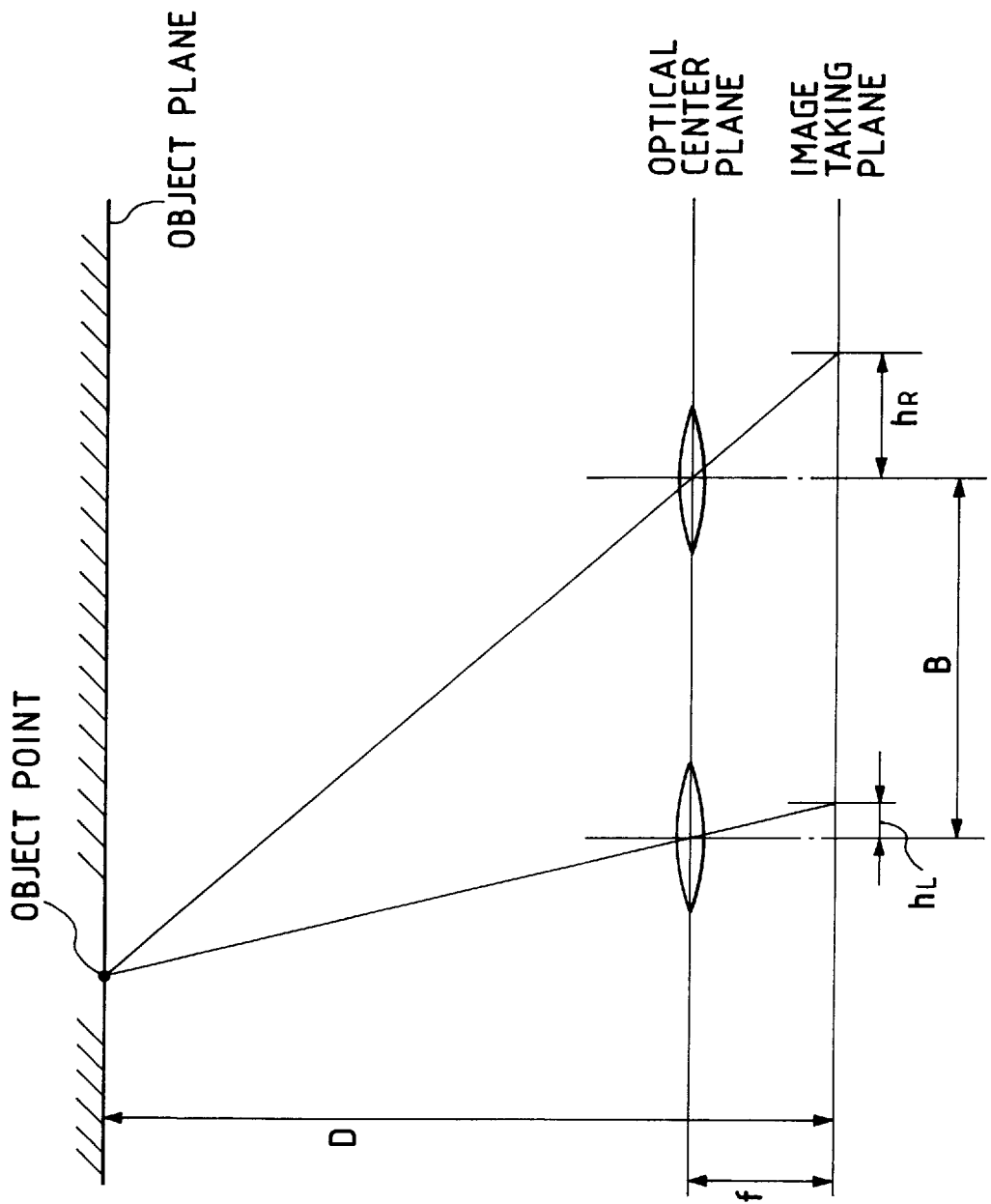
FIG. 26 is a structural drawing to show a conventional stereo distance-measuring method.
Figure 27:
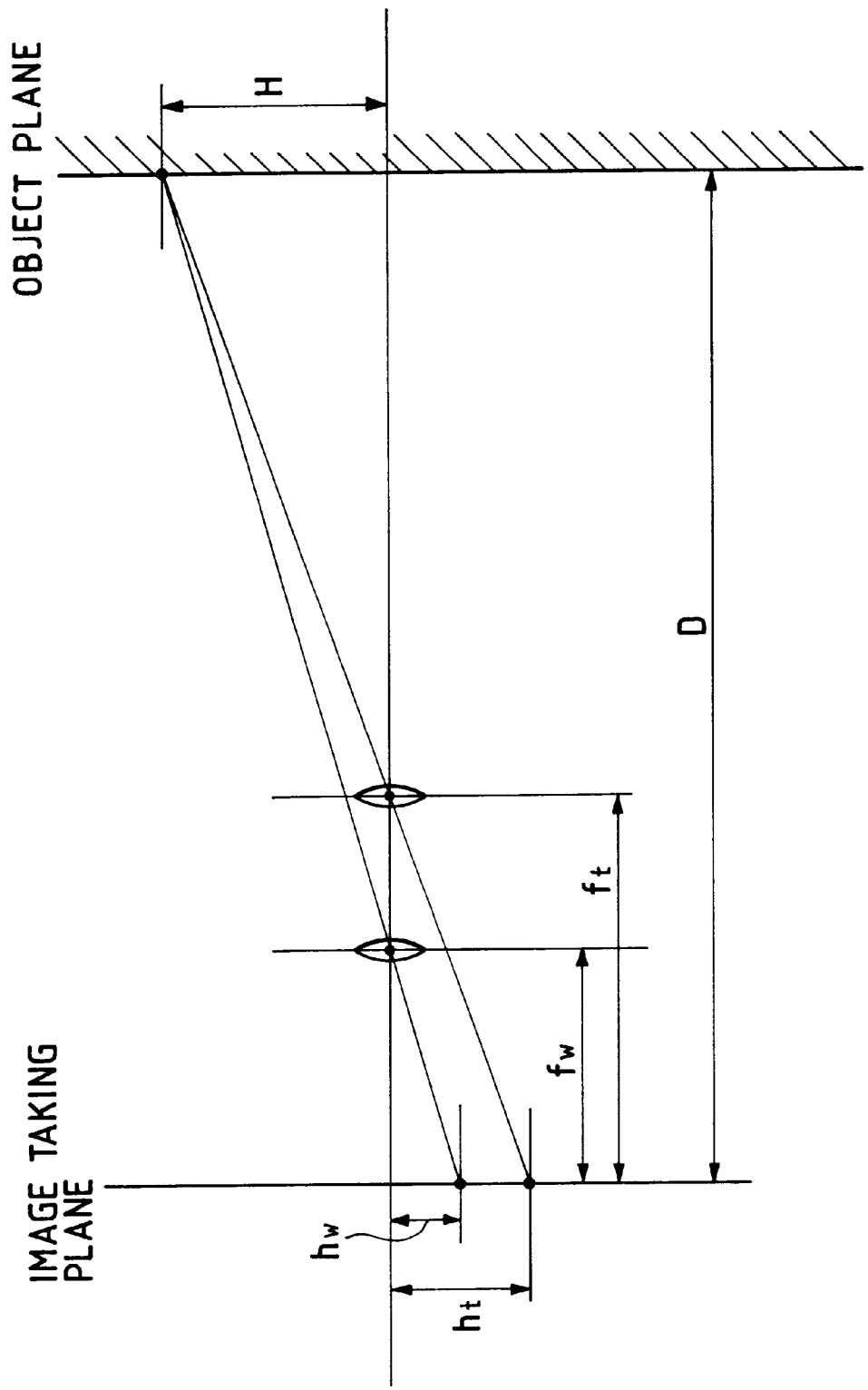
FIG. 27 is a structural drawing to show a conventional zoom distance-measuring method.
Figure 28:
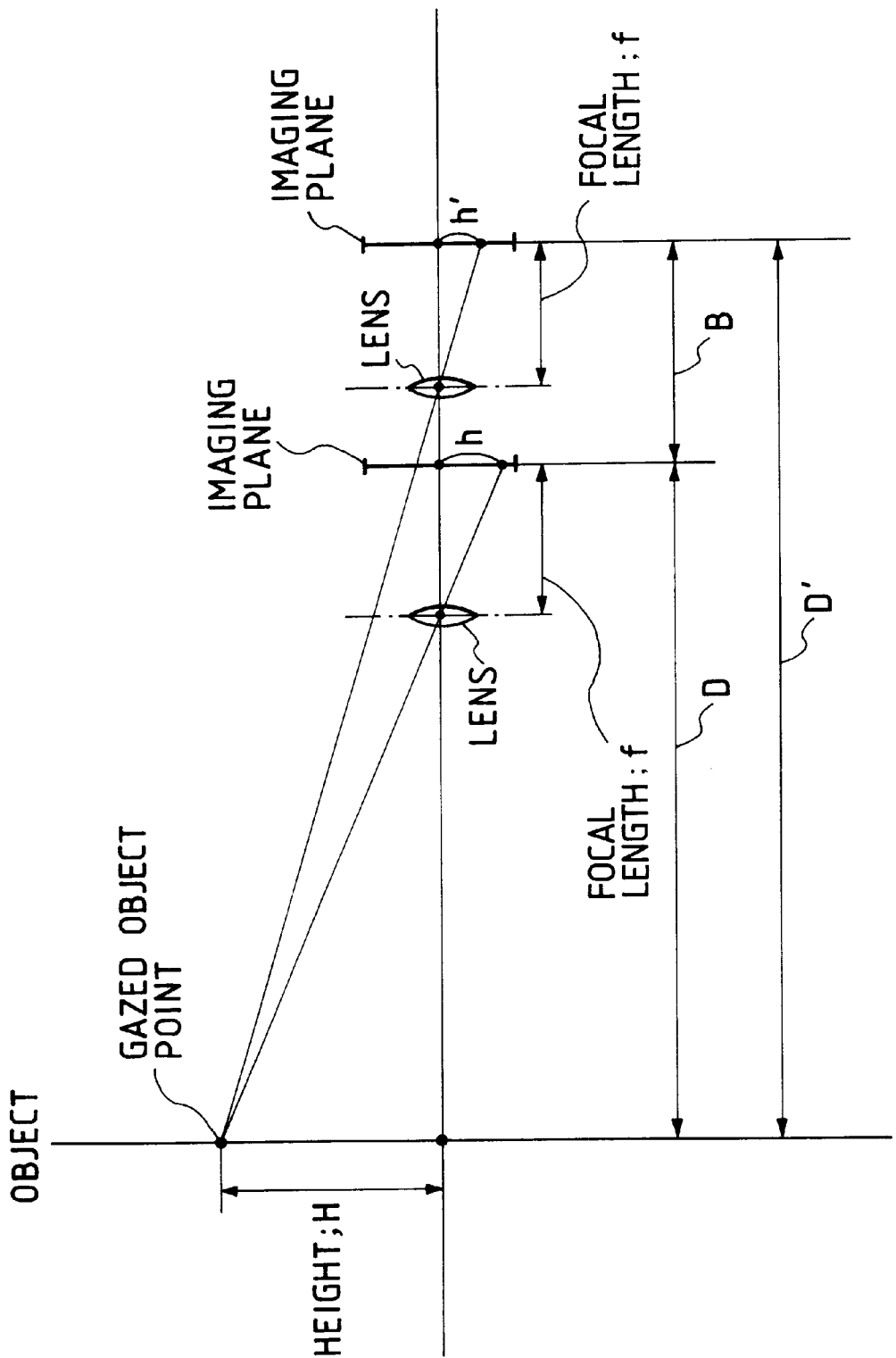
FIG. 28 is a structural drawing to show a conventional front-to-back stereo distance-measuring method.

FIG. 25 shows another embodiment. Differences of the present embodiment from FIG. 17 reside in that the two cameras 201, 202 are directed inward to each other and in that distortion correcting portions 700, 710 for correcting distortion of image are added immediately after the cameras 201, 202.

As shown in FIG. 25, images taken from two left and right (or up and down) different visual points by the cameras 201, 202 will have trapezoid distortion because of intersection of optical axes. Thus, the trapezoid distortion should be corrected before image data is sent to each distance-measuring portion 206, 207, 208.

Here, let B be the baseline length of two cameras 201, 202, P be an angle between the two cameras 201, 202, which is an angle of convergence, (x, y) be coordinates of one image as a reference out of a plurality of input images taken, the origin (0, 0) be at the center of image, f be the focal length of taking lenses, and D be the object distance. Then a correspondence relation (u, v) of each point in a stereo image pair is expressed by the following equations.

$$u = -f \cdot B/D(x, y) - \{(x^2 + f^2) \cdot \sin P\}/(f \cdot \cos P + x \cdot \sin P) \qquad (42)$$

$$v = [-\{f - (f \cdot \cos P + x \cdot \sin P)\} \cdot y]/(f \cdot \cos P + x \cdot \sin P) \qquad (43)$$

The first term, $-f \cdot B/D(x, y)$ in Equation (42) indicates an amount of parallel shift of image due to a difference between visual points of two cameras 201, 202, which is irrespective of the trapezoid distortion. The other terms all include the convergence angle P, so that they are terms to cause the trapezoid distortion. It is seen from Equations (42), (43) that a larger distortion appears around an image with a greater value of (x, y).

The distortion correcting portion 700, 710 effects reverse correction of the terms including the convergence angle P in Equations (42), (43), thereby geometrically correcting images as if they were input through two cameras with parallel optical axes.

Since this embodiment as described above is arranged to geometrically correct the trapezoid distortion of object caused by the convergence angle given between the zoom lenses before correspondence, the measurement accuracy can be improved for both the stereo distance-measuring method and the zoom distance-measuring method. Since each camera 201, 202 is directed to an object, more pixels can capture the subject, which enables distance measurement of finer portions of the object. Namely, this embodiment has an intrinsic effect of improving the resolution of distance measurement.

What is claimed is:

1. A multi-eye image pickup apparatus comprising:

a plurality of image pickup means set at a predetermined angle of convergence, each for picking up an image of a desired object;

a plurality of motion vector extracting means provided corresponding to said image pickup means, each for extracting a motion vector of said object between predetermined frames from images obtained in time series by the corresponding image pickup means;

stereoscopic parallax extracting means for extracting a stereoscopic parallax of said object between said predetermined frames from images obtained in time series from said respective image pickup means; and means for obtaining a final motion vector of said object between said predetermined frames from motion vectors extracted by said respective motion vector extracting means and the stereoscopic parallax extracted by said stereoscopic parallax extracting means.

2. The apparatus according to claim 1, wherein the motion vectors extracted by said respective motion vector extracting means are defined as first motion vectors;

said apparatus comprising:

stereoscopic parallax motion vector extracting means for extracting a stereoscopic parallax motion vector of said object between said predetermined frames from the stereoscopic parallax extracted by said stereoscopic parallax extracting means;

converting means for converting the stereoscopic parallax motion vector extracted by said stereoscopic parallax motion vector extracting means into second motion vectors corresponding to said first motion vectors, based on said predetermined angle of convergence; and motion vector determining means for determining the final motion vector of said object between said predetermined frames from the first motion vectors extracted by said respective motion vector extracting means and the second motion vectors converted into by said converting means.

3. The apparatus according to claim 2, wherein said motion vector determining means comprises comparing and investigating means provided corresponding to said respective motion vector extracting means, each for investigating if the first motion vectors each extracted by the motion vector extracting means are coincident with the second motion vectors converted by the converting means, and integrating means for integrating said first motion vectors with said second motion vectors, based on results of investigation by said respective comparing and investigating means; and wherein said integrating means is so arranged that if a first motion vector coincides with a second motion vector said integrating means takes a mean value or weighted mean of the first and second motion vectors, that if either one of the first motion vectors coincides with a second motion vector the integrating means takes a mean value or weighted mean of said coincident first motion vector and said second motion vector, and that if a second motion vector does not coincide with any of the first motion vectors the integrating means employs either one of said first motion vectors.

4. The apparatus according to claim 2, wherein extraction of the motion vectors, the stereoscopic parallax, and the stereoscopic parallax motion vector by said motion vector extracting means, said stereoscopic parallax extracting means, and said stereoscopic parallax motion vector extracting means is carried out by extracting common regions from images obtained in time series from the image pickup means or from images obtained from the respective image pickup means and obtaining a relative deviation amount between said common regions extracted.

5. A three-dimensional shape measuring method comprising:

a step of performing a stereo distance-measuring method for measuring an object distance, using a plurality of images obtained when an object is taken from a plurality of different points of view;

a step of performing a zoom distance-measuring method for measuring an object distance, using a plurality of time-serial images obtained when said object is taken at a plurality of different angles of view; and a step of measuring a three-dimensional shape of said object by combining a measurement result obtained by said stereo distance-measuring method with a measurement result obtained by said zoom distance-measuring method.

6. The method according to claim 5, wherein differences of zoom magnifications are corrected between the plurality of images used in said zoom distance-measuring method, using the object distance measured by said stereo distance-measuring method.

7. The method according to claim 5, wherein a plurality of image pickup apparatus are used and wherein said each image pickup apparatus is directed so that said object is included in an angle of view of said apparatus, depending upon a zoom magnification.

8. The method according to claim 5, wherein measurement of the object distance is performed adaptively utilizing a past measurement result in at least one of said stereo distance-measuring method and zoom distance-measuring method.

9. A three-dimensional shape measuring apparatus comprising:

image pickup means for picking up images of an object from a plurality of different points of view and at a plurality of different angles of view;

stereo distance-measuring means for measuring an object distance, using a plurality of images obtained when said image pickup means takes said object from the plurality of points of view;

zoom distance-measuring means for measuring an object distance, using a plurality of images obtained when said image pickup means takes said object at the plurality of angles of view; and integration measuring means for measuring a three-dimensional shape of said object, using a measurement result obtained by said stereo distance-measuring means and a measurement result obtained by said zoom distance-measuring means.

10. The apparatus according to claim 9, further comprising image correcting means for correcting differences of zoom magnifications between the plurality of images used in said zoom distance-measuring means, using the object distance measured by said stereo distance-measuring means.

11. The apparatus according to claim 9, wherein said image pickup means comprises a plurality of image pickup apparatus and wherein said each image pickup apparatus is directed so that said object is included in an angle of view of said apparatus, depending upon a zoom magnification.

12. The apparatus according to claim 9, wherein measurement of the object distance is performed adaptively utilizing a past measurement result in at least one of said stereo distance-measuring means and zoom distance-measuring means.

13. A three-dimensional object shape recognizing method comprising:

a step of recognizing an object by a multi-viewpoint image pickup method of a horizontal/vertical plane parallax type using a plurality of images input from different points of view at a same object distance;

a step of recognizing an object by a multi-viewpoint image pickup method of a front-to-back parallax type using a plurality of images input from a same point of view at different object distances; and a step of taking a weighted mean integrally using recognition results of the three-dimensional object each obtained in said above steps.

14. The method according to claim 13, comprising a step of performing magnification correction between images of different magnifications used in said multi-viewpoint image pickup method of the front-to-back parallax type.

15. The method according to claim 13, comprising a step of performing magnification correction depending upon an object distance obtained by said multi-viewpoint image pickup method of the horizontal/vertical plane parallax type.

16. The method according to claim 13, wherein a Fourier-Mellin transformation method is used for correspondence between images of different magnifications used in said multi-viewpoint image pickup method of the front-to-back parallax type.

17. The method according to claim 13, wherein a filter is used to separate oblique spatial gradient components of said images from horizontal/vertical spatial gradient components of said images, said horizontal/vertical spatial gradient components of said images are supplied with priority to said multi-viewpoint image pickup method of the horizontal/vertical plane parallax type, and said oblique spatial gradient components of said images are supplied with priority to said multi-viewpoint image pickup method of the front-to-back parallax type.

18. The method according to claim 13, wherein a past three-dimensional object shape recognition result is utilized.

19. The method according to claim 13, wherein a plurality of image pickup apparatus are arranged to be directed so that a same object is included in fields of the apparatus, depending upon speeds of forward or backward motions of said image pickup apparatus.

20. A three-dimensional object shape recognizing apparatus comprising:

recognizing means for recognizing an object by a multi-viewpoint image pickup method of a horizontal/vertical plane parallax type using a plurality of images input from different points of view at a same object distance;

recognizing means for recognizing an object by a multi-viewpoint image pickup method of a front-to-back parallax type using a plurality of images input from a same point of view at different object distances; and integration processing means for taking a weighted mean of recognition results of the three-dimensional object obtained by said respective recognizing means.

21. The apparatus according to claim 20, comprising correcting means for performing magnification correction between images of different magnifications used in said multi-viewpoint image pickup method of the front-to-back parallax type.

22. The apparatus according to claim 20, comprising correcting means for performing magnification correction depending upon an object distance obtained by said multi-viewpoint image pickup method of the horizontal/vertical plane parallax type.

23. The apparatus according to claim 20, wherein a Fourier-Mellin transformation method is used for correspondence between images of different magnifications used in said multi-viewpoint image pickup method of the front-to-back parallax type.

24. The apparatus according to claim 20, which comprises a filter for separating oblique spatial gradient components of the images from horizontal/vertical spatial gradient components of said images, wherein said horizontal/vertical spatial gradient components of the images are supplied with priority to said recognizing means by said multi-viewpoint image pickup method of the horizontal/vertical plane parallax type and wherein said oblique spatial gradient components of the images are supplied with priority to said recognizing means by said multi-viewpoint image pickup method of the front-to-back parallax type.

25. The apparatus according to claim 20, which utilizes a past three-dimensional object shape recognizing result.

26. The apparatus according to claim 20, wherein a plurality of image pickup apparatus are arranged to be directed so that a same object is included in fields of the apparatus, depending upon speeds of forward or backward motions of said image pickup apparatus.

* * * * *

UNITED STATES PATENT AND TRADEMARK OFFICE
CERTIFICATE OF CORRECTION

PATENT NO. : 6,118,475
DATED : September 12, 2000
INVENTOR(S) : Katsumi Iijima et al.

It is certified that error appears in the above-identified patent and that said Letters Patent is hereby corrected as shown below:

Title page,
Item [75], Inventors, delete "Hachioji" from Katsumi Iijuma's address and insert therefore -- Tokyo --.

Column 2,
Line 4, "gradient e is" should read -- gradient $\underline{e}$ is --.
Line 6, change d in" should read -- change $\underline{d}$ in --.
Line 15, "pixelsx8" should read -- pixels x 8 --.

Column 25,
Line 43, Equation (29),
"$(1/D)_t^+ = K_t \cdot u_t + [1 - B \cdot f \cdot K_t] \cdot (1/D) hd\ t''$ should read -- $(1/D)_t^+ = K_t \cdot u_t + [1 - B \cdot f \cdot K_t] \cdot (1/D)_t^-$ --.

Column 27,
Lines 8-9, "t he purpose." should read -- the purpose. --.

Column 29,
Line 32, "a times," should read -- $\underline{a}$ times --.

Signed and Sealed this

Twenty-eighth Day of September, 2004

JON W. DUDAS
*Director of the United States Patent and Trademark Office*